(12) United States Patent
Villablanca

(10) Patent No.: US 7,551,461 B2
(45) Date of Patent: Jun. 23, 2009

(54) METHOD AND APPARATUS TO REDUCE DISTORTION OF CURRENTS FEEDING AN AC/DC RECTIFIER SYSTEM

(75) Inventor: Miguel Villablanca, Calle Silvina Hurtado 1539, Apt. 804, Providencia, Santiago (CL)

(73) Assignees: Miguel Villablanca, Santiago (CL), part interest; Universidad De Santiago De Chile, Santiago (CL), part interest (*) Notice: Subject to any disclaimer, the term of this patent is extended or adjusted under 35 U.S.C. 154(b) by 0 days.

(21) Appl. No.: 10/860,661

(22) Filed: Jun. 4, 2004

(65) Prior Publication Data

US 2005/0013147 A1 Jan. 20, 2005

(30) Foreign Application Priority Data

Jun. 4, 2003 (CL) ................................. 1151-2003
May 31, 2004 (CL) ................................. 1335-2004

(51) Int. Cl.
*H02M 7/08* (2006.01)
(52) U.S. Cl. ............................... 363/67; 363/70; 363/85
(58) Field of Classification Search ................... 363/37, 363/44, 48, 67, 68, 69, 70, 84, 85, 86, 87, 363/88, 89, 125–129; 307/77; 323/207, 323/211
See application file for complete search history.

(56) References Cited

U.S. PATENT DOCUMENTS

| | | | | |
|---|---|---|---|---|
| 3,161,820 A | * | 12/1964 | Chumakov | 323/256 |
| 4,208,709 A | * | 6/1980 | Garnham et al. | 363/90 |
| 4,532,581 A | * | 7/1985 | Miyairi | 363/39 |
| 4,638,416 A | * | 1/1987 | Neupauer et al. | 363/35 |
| 4,739,466 A | * | 4/1988 | Glennon et al. | 363/89 |
| 4,866,591 A | * | 9/1989 | Cook et al. | 363/67 |
| 5,267,137 A | * | 11/1993 | Goebel | 363/87 |
| 5,345,375 A | * | 9/1994 | Mohan | 363/40 |
| 5,541,830 A | * | 7/1996 | Moore et al. | 363/69 |
| 5,867,379 A | * | 2/1999 | Maksimovic et al. | 363/89 |
| 5,903,066 A | * | 5/1999 | Enjeti et al. | 307/105 |

(Continued)

OTHER PUBLICATIONS

Sewan Choi and Prasad Enjeti and Honghee Lee and Ira Pitel, A New Active Intephae Reactor for 12-Pulse Rectifiers Provides Clean Power Utility Interface, 1995, Industry Applications Convference, 1995, Thirtieth IAS Annual Meeting, IAS '95, Conference Record of the 1995 IEEE, pp. 2468-2474.*

*Primary Examiner*—Akm E Ullah
*Assistant Examiner*—Harry Behm
(74) *Attorney, Agent, or Firm*—Banner & Witcoff, Ltd.

(57) ABSTRACT

AC/DC rectifiers are vital elements in industry. Their uses include HVdc electric energy transmission, uninterruptible power supplies (UPS), electrochemical plants, railway systems, variable speed induction motors, telephone plants, etc. Regrettably, currents $I_A$, $I_B$ and $I_C$ on the primary side of the transformer feeding the rectifier are distorted, which is penalized worldwide. Conventionally, this distortion is reduced through an apparatus connected either on the primary or secondary side of the transformer. The proposed apparatus, however, is connected on the DC side of the rectifier. It is demonstrated in a laboratory prototype that this apparatus achieves notably low distortion levels (ideally zero) in currents $I_A$, $I_B$ and $I_C$, at low cost and with a simple and robust control system, which is capable of handling rapid load variations. It can also be repaired on line without the need to disconnect the system.

12 Claims, 21 Drawing Sheets

U.S. PATENT DOCUMENTS

| | | | | |
|---|---|---|---|---|
| 6,081,437 A | * | 6/2000 | Chen et al. | 363/70 |
| 6,178,102 B1 | * | 1/2001 | Stanley | 363/44 |
| 6,594,164 B2 | * | 7/2003 | Suzuki | 363/69 |
| 7,148,661 B2 | * | 12/2006 | Trainer et al. | 323/207 |
| 2003/0063480 A1 | * | 4/2003 | Morita et al. | 363/37 |

* cited by examiner

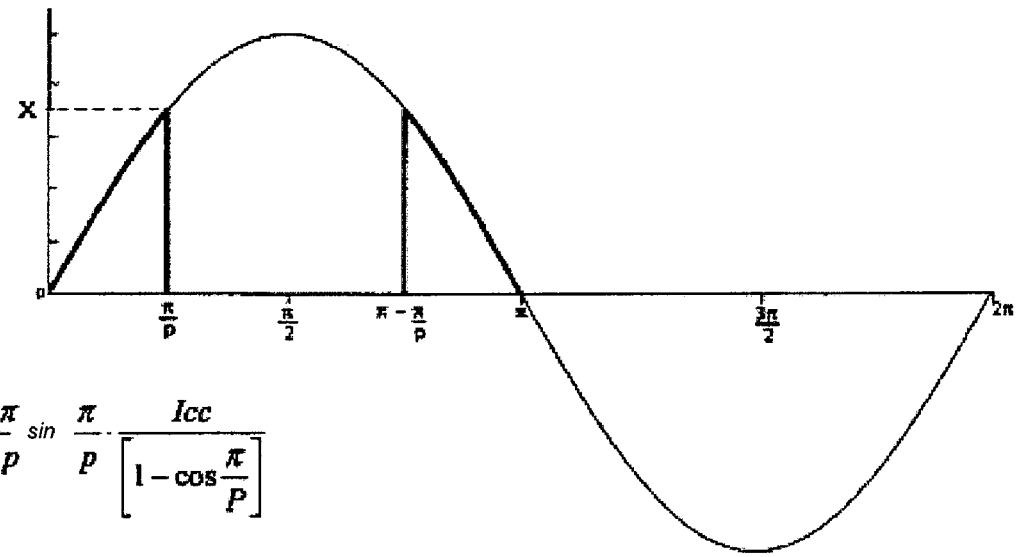

$$X = k \cdot \frac{\pi}{p} \sin \frac{\pi}{p} \cdot \frac{Icc}{\left[1 - \cos \frac{\pi}{P}\right]}$$

Where:

$X$ = magnitude of the semi-triangular currents.
$k = 1$ for series connection of bridges; $k = 0.5$ for parallel connection of bridges.
$p$ = pulse number of both rectifier bridges (in general p=3 and p=6 for practical reasons).
$Icc$ = average value of load current.

Bridge current if p=3

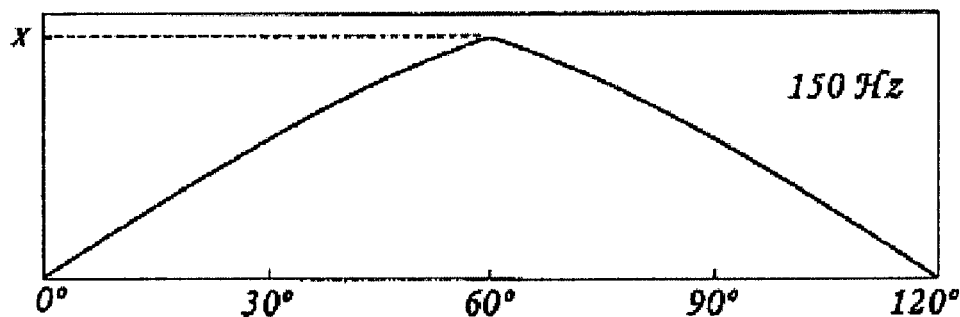

Bridge current if p=6

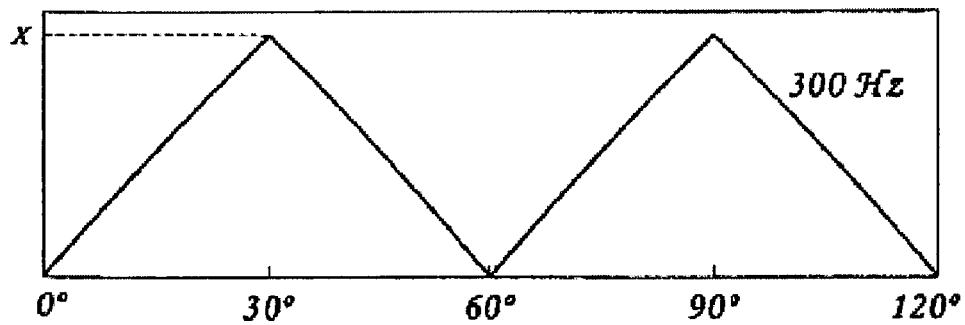

Fig. 6

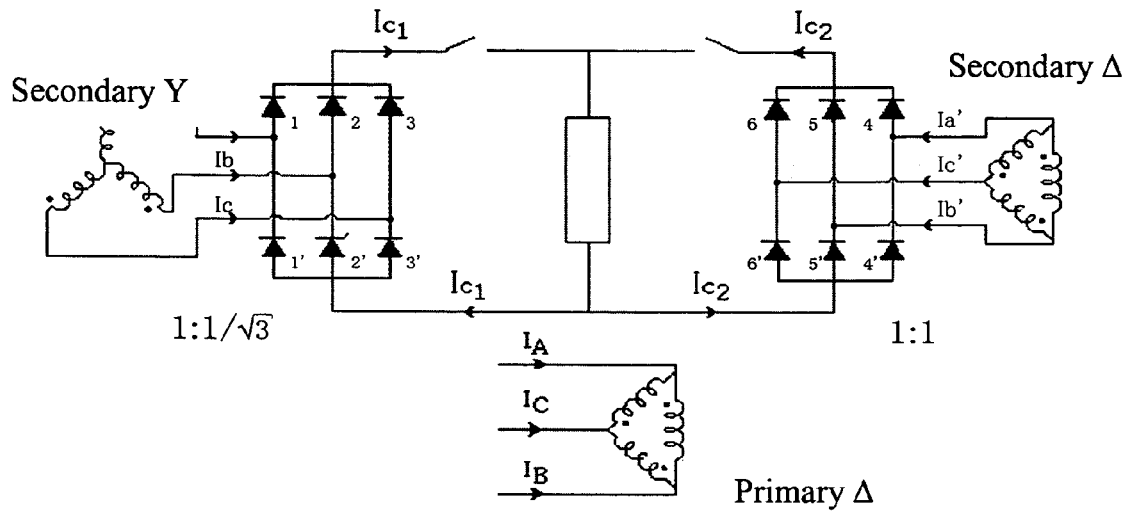
$$I_A = I'_a + \frac{I_a - I_c}{\sqrt{3}}$$
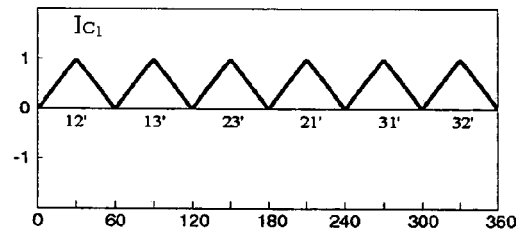
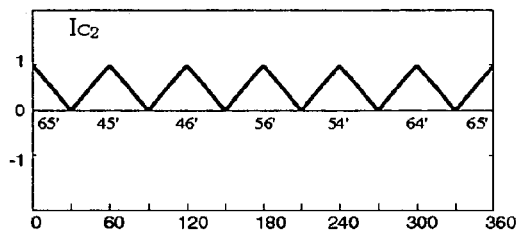
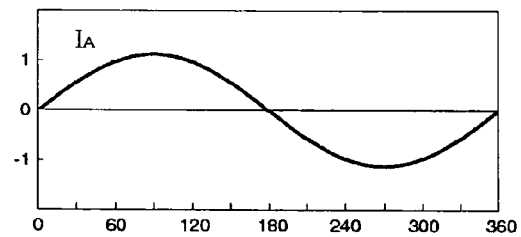
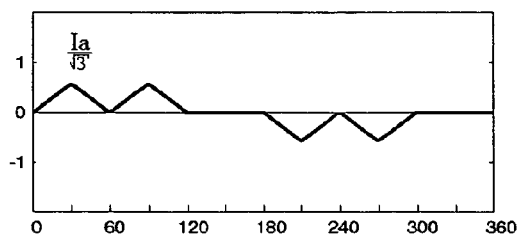
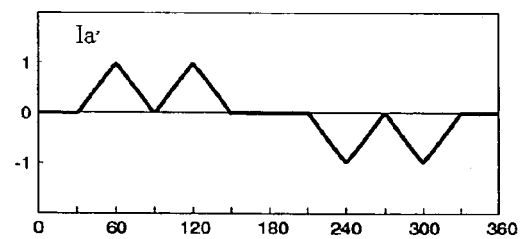
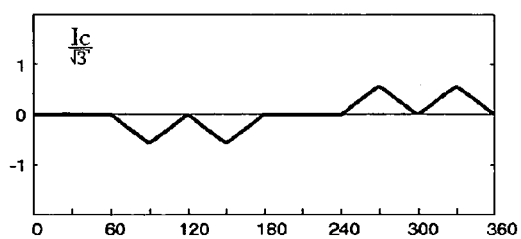
Fig. 8

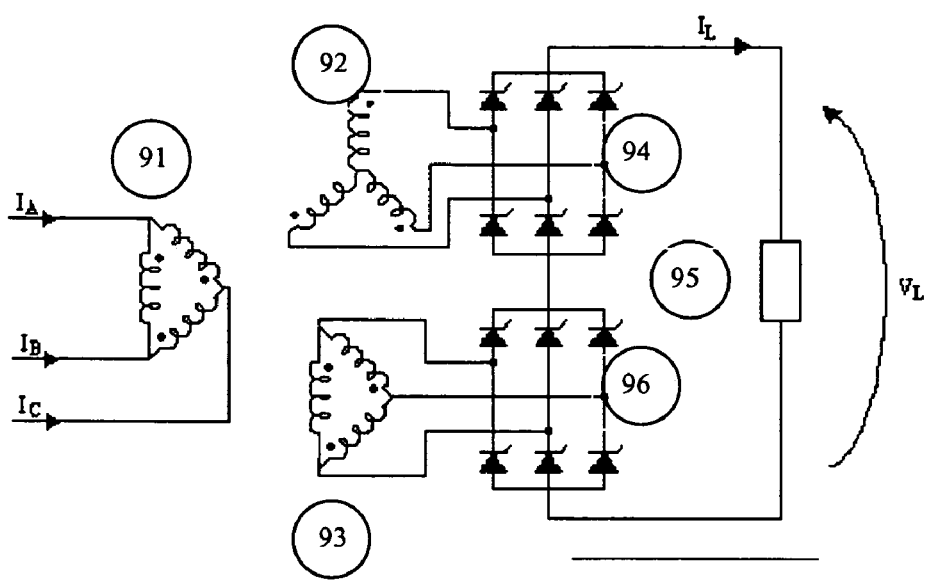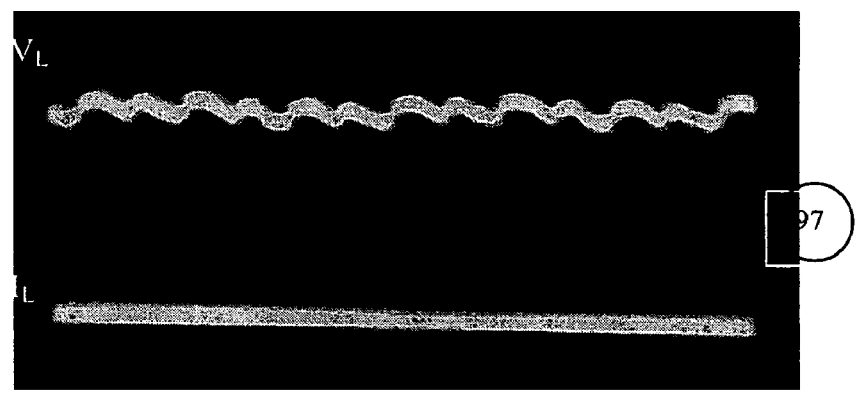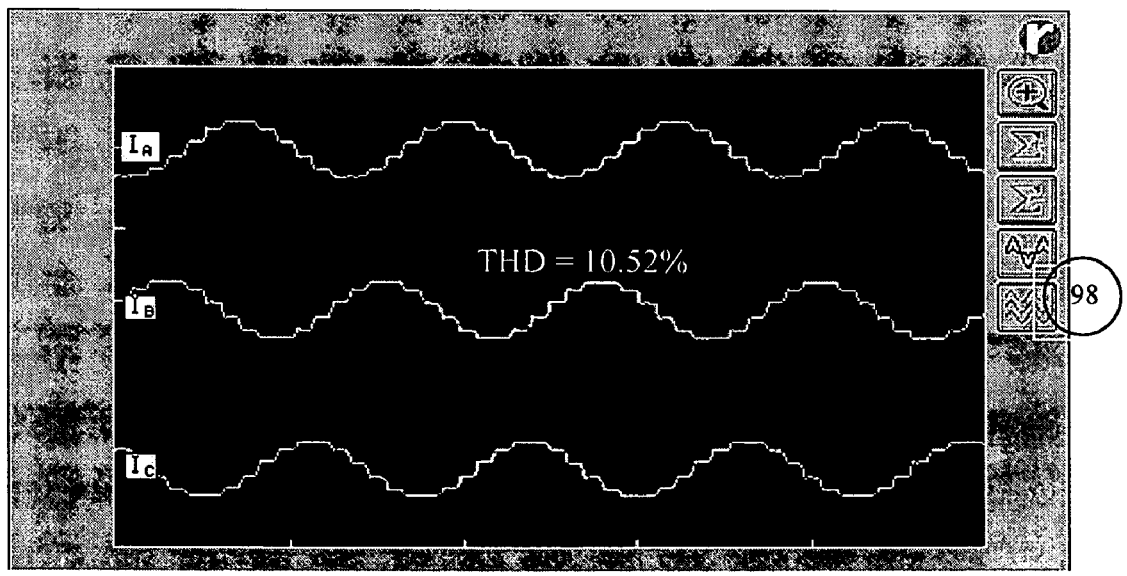
Fig. 9

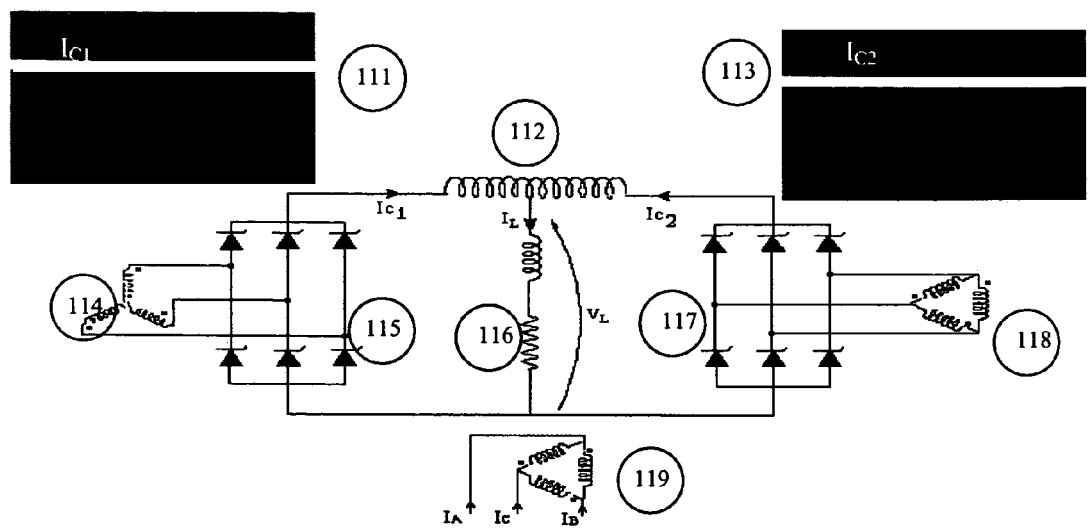
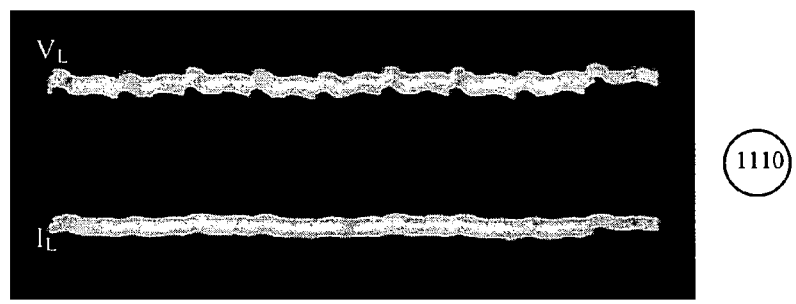
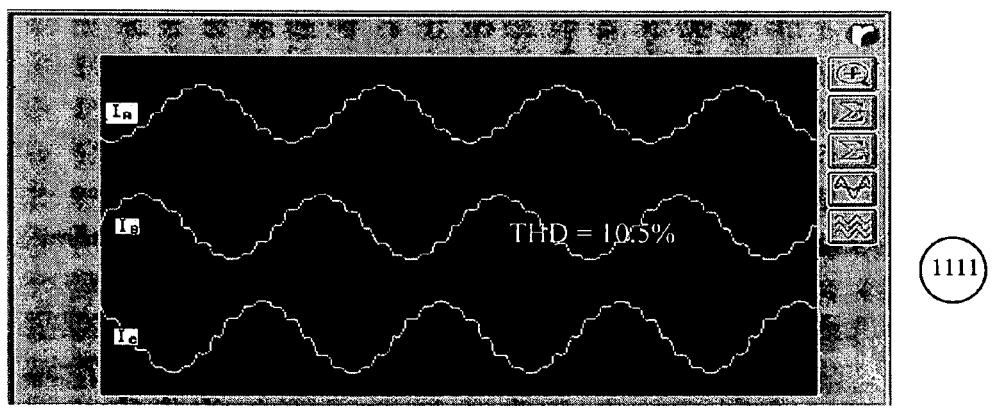
Fig. 11
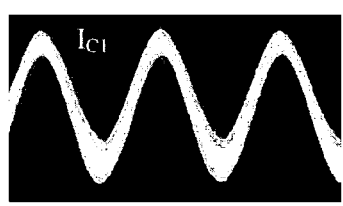
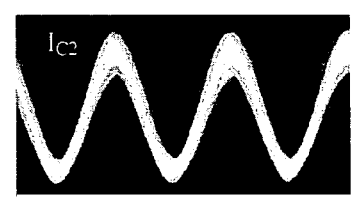

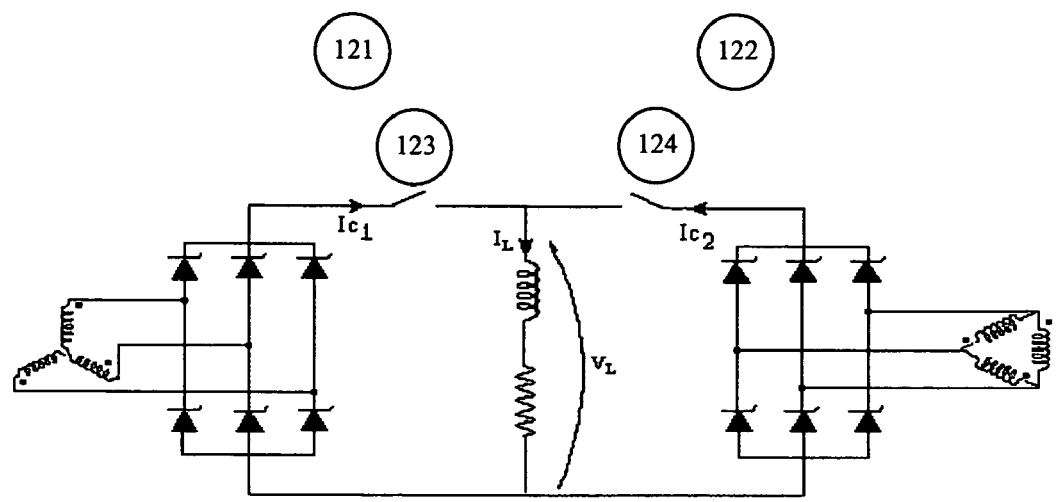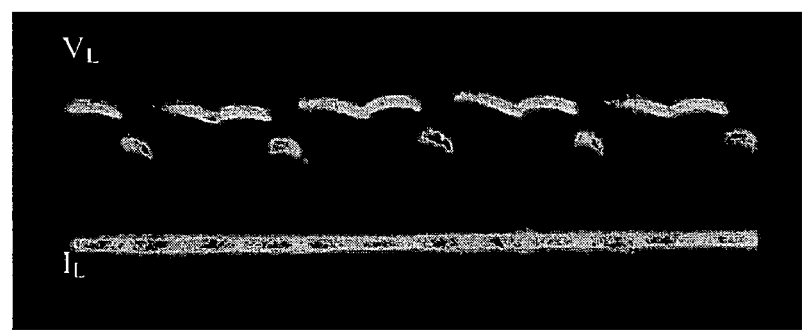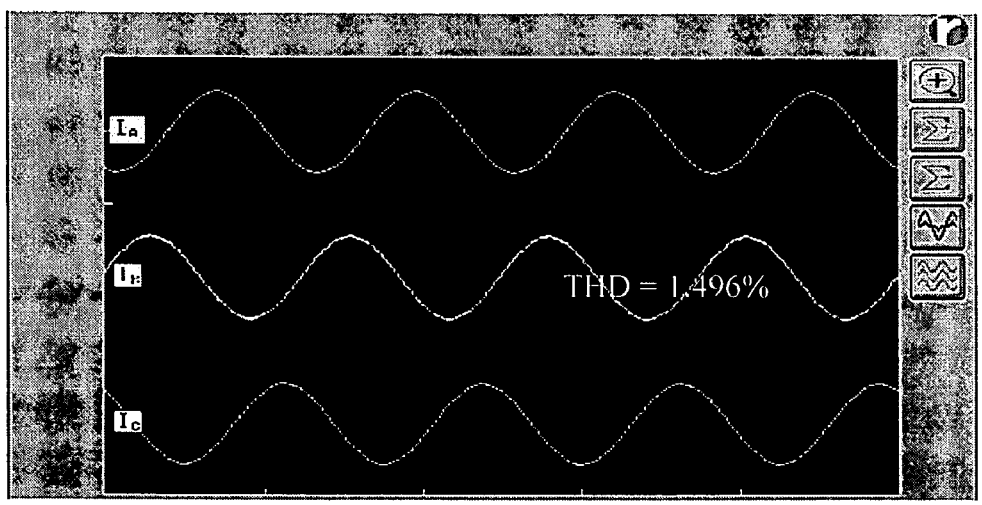
Fig. 12

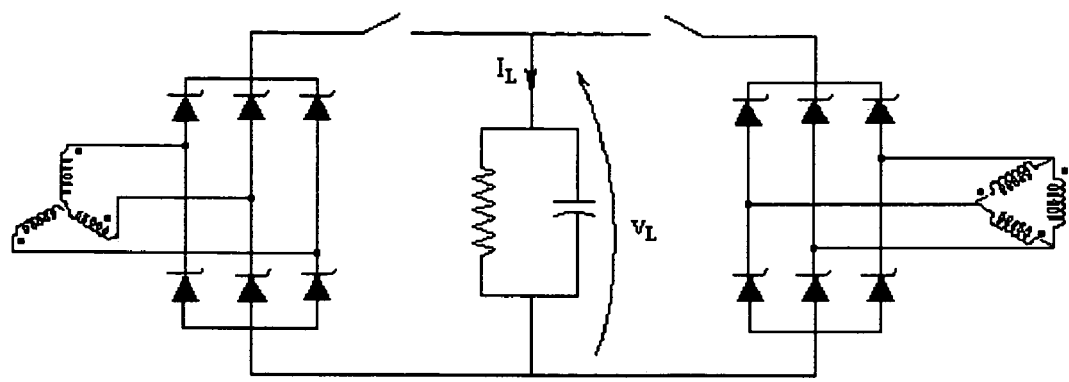
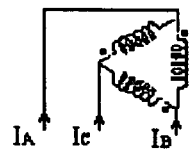
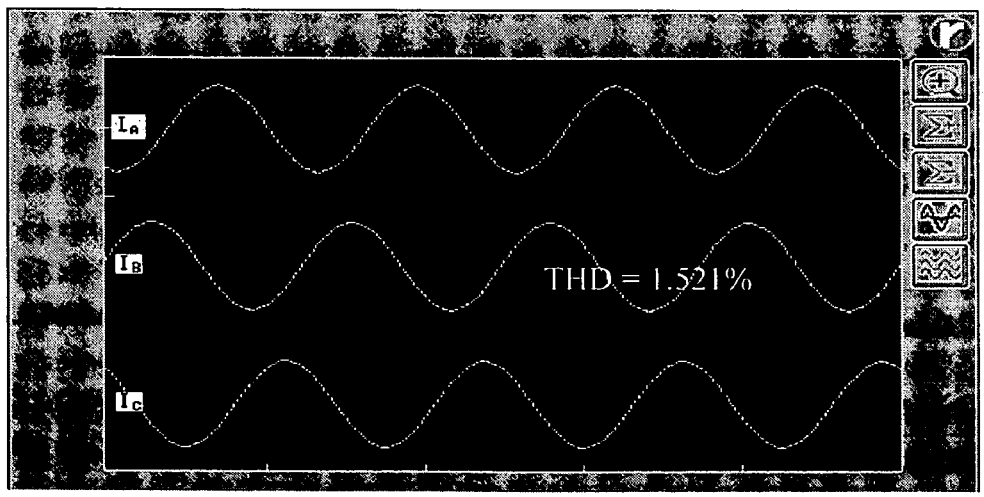
Fig. 14

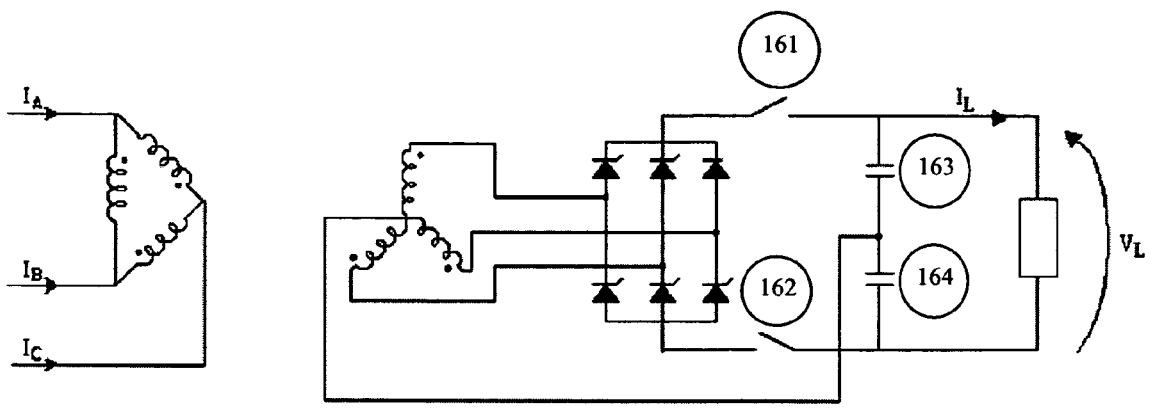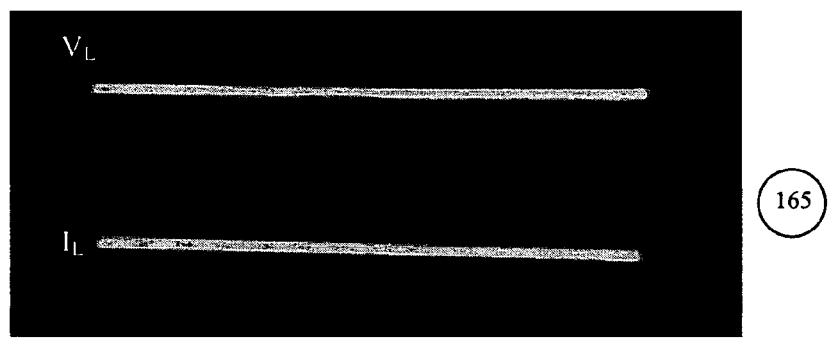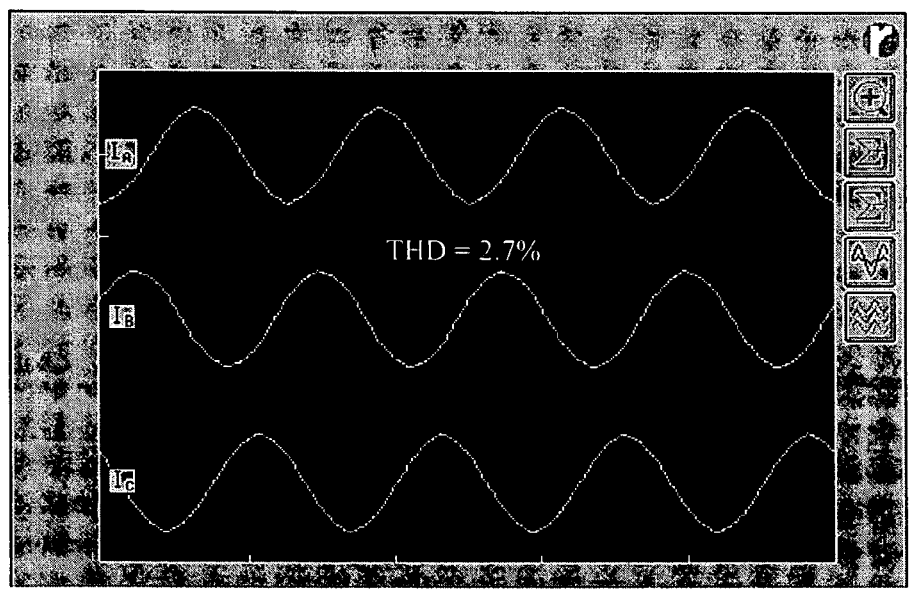
Fig. 16

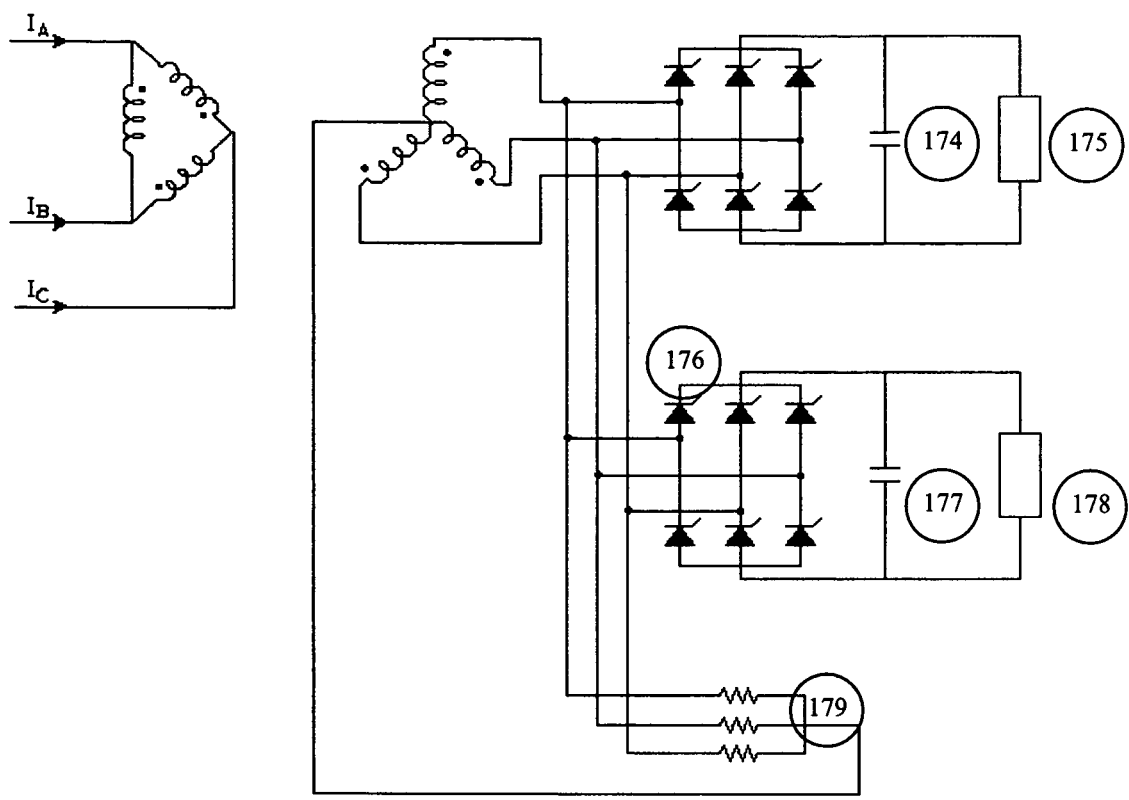
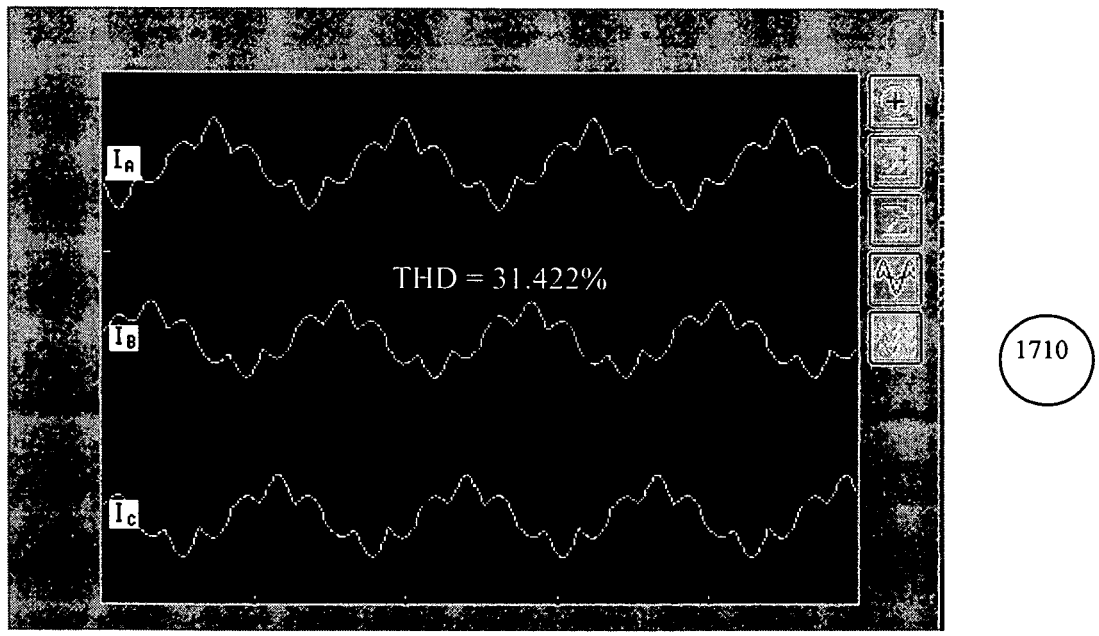
Fig. 17

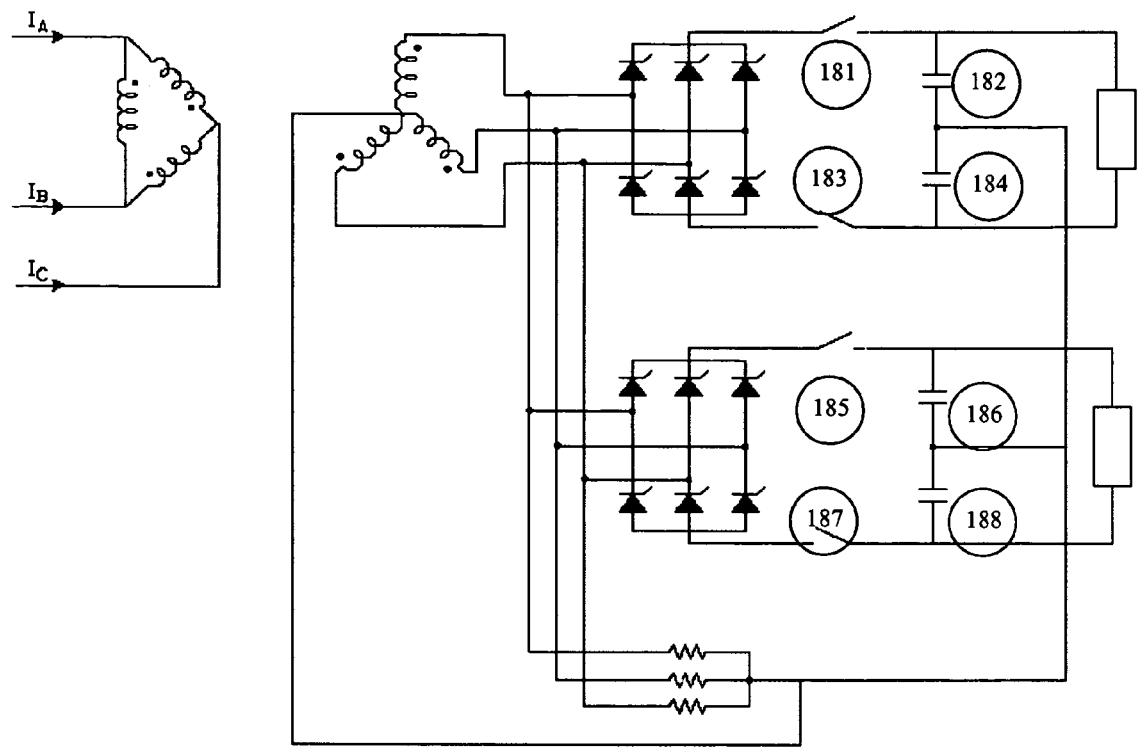
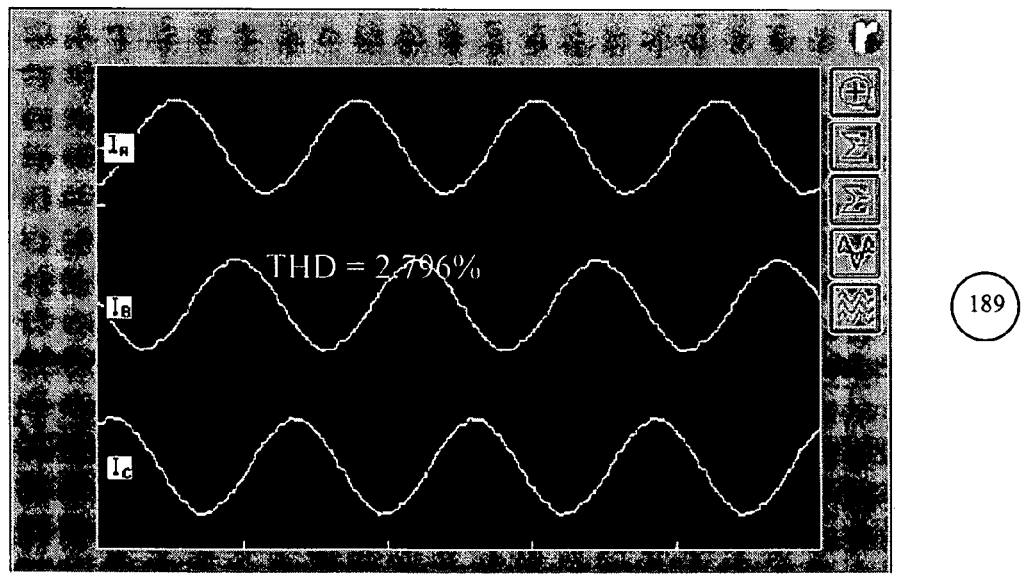
Fig. 18

METHOD AND APPARATUS TO REDUCE DISTORTION OF CURRENTS FEEDING AN AC/DC RECTIFIER SYSTEM

BACKGROUND OF THE INVENTION

The present invention relates to a method and apparatus to reduce distortion in currents $I_A$, $I_B$ and $I_C$ feeding an AC/DC rectifier system. This system corresponds to a transformer in series with an AC/DC rectifier.

AC/DC rectifier systems convert alternating current (AC) into direct current (DC) and have become vital elements in industry. They allow the functioning of variable speed AC motors, electrochemical plants, induction furnaces, HVdc energy transmission systems, railway systems, uninterruptible power supplies (UPS), telephone plants, etc.

Regrettably, currents feeding AC/DC rectifier systems are distorted, which in turn produces critical problems in the network. This is a worldwide problem and in Chile a law has recently been passed, based on the North American regulation, which involves fines and disconnections in extreme cases of distortion.

Distorted currents are undesirable as they provoke voltage distortions in the network. These voltage distortions affect other network loads, especially where computer and communication systems are involved. Further problems include overheating of equipment (motors, transformers, neutral conductors, etc), overvoltages owing to resonant conditions in the network, errors in measuring instruments, malfunction of protective devices and interference with both communication and control systems.

At present, the market is offering several alternatives to reduce current distortion. Since this is such a complicated technical problem the technologies offered are numerous, among them are the use of passive and active filters. These elements are connected, either on the primary or secondary side of the transformer feeding the rectifier and can be repaired without disconnecting the system, a characteristic also offered by the proposed apparatus.

Passive and active filters reduce distortion in different ways. Passive filters do so by absorbing the distortion component of the line current. By contrast, active filters inject the distortion component to cancel current distortion along the power line.

The main disadvantage of passive filters is their complicated design, given that it is necessary to know complex parameters of the electric system feeding the AC/DC rectifier. Other disadvantages are related to cost, size, temperature changes, component aging and instability in the presence of system disturbances. Additionally, the filter overloads when other AC/DC rectifiers are in the vicinity and, in the case of a diode rectifier, injects reactive power, which elevates elevating the voltage network.

Similarly, the main disadvantage of active filters is their complexity, which implies bulky control circuits where state-of-the-art microprocessors (DSP) play a fundamental role. Other disadvantages are the need for an energy storing element (L or C) with a critical control circuit and the generation of electromagnetic disturbances into the network.

The proposed apparatus to reduce current distortion is an active filter installed on the DC of the rectifier. It is demonstrated in a laboratory prototype that this apparatus achieves notably low distortion levels (ideally zero), at low cost, with simple control circuits (without DSP) and gives a robust performance with high dynamic response under rapid load variations. It can also be repaired on line without the need to disconnect the system, has no energy storing elements L or C and generates a low level of electromagnetic disturbance into the network. This demonstrates that if the currents on the DC side are accurately shaped it is theoretically possible to achieve currents with zero distortion on the AC side of the rectifier system.

SUMMARY OF THE INVENTION

It is an objective of the present invention to reduce the distortion of currents $I_A$, $I_B$ and $I_C$ feeding the AC/DC rectifier system, below the legal limits and without affecting the quality of voltage and current on the DC side.

It is another objective of the present invention to generalize the proposed apparatus, so that the aforementioned distortion reduction is achieved with different configurations of the AC/DC rectifier. This implies that both bridges of the AC/DC rectifier can be connected either in series or parallel, have "p" pulses per period at fundamental frequency and contain either diodes or thyristors. The simultaneous feeding of "n" AC/DC rectifiers is also considered.

It is yet another objective of the present invention that the distortion reduction be achieved for any type of load on the DC side, including loads with a smoothing capacitor. When the capacitor is increased in size to improve the DC voltage, currents $I_A$, $I_B$ and $I_C$ become more distorted on the AC side of the rectifier system.

It is a further objective of the present invention that the aforementioned distortion reduction be achieved with smaller and cheaper control circuits than the conventional counterpart.

It is an objective of the present invention that the distortion reduction be achieved with simpler power circuits than the conventional counterpart. This reduces cost, size and increases the efficiency of the installation.

It is another objective of the present invention that under rapid load current variations on the DC side, the apparatus responds quickly and efficiently in the new operating condition. That is, it involves a robust performance with high dynamic response under rapid load variations.

It is yet another objective of the present invention that the proposed apparatus be repaired on line without the need to stop the load service, which may prove critical.

It is a further objective of the present invention that the proposed apparatus be protected against severe disturbances in the electric system.

In accordance with one aspect of the present invention, to reduce current distortion on the AC side of the rectifier system, the shape of the current circulating through both bridges of the AC/DC rectifier must be semi-triangular, with curved sides as shown in FIG. 6, in which two cases are analyzed where p=3 and p=6. Clearly, the period of the semi-triangular current is $2\pi/p$ and accordingly the frequency is (p·f) Hz, where f is the fundamental frequency. It is demonstrated that this semi-triangular current circulating through each bridge develops into a theoretically pure sinusoid upstream of the transformer.

In accordance with another aspect of the present invention, when the bridges are connected in series, the average value of bridge currents is equal to the average value of load current. However, when the bridges are connected in parallel, the average value of bridge currents is 50% of the average value of load current. Thus, in monitoring the average value of load current it is possible to adjust the magnitude X of the semi-triangular current according to the following equation:

$$X = k \cdot \frac{\pi}{p} \sin\frac{\pi}{p} \cdot \frac{Icc}{\left(1 - \cos\frac{\pi}{p}\right)} [A]$$

Where:
X=magnitude of semi-triangular currents.
k=1 for series connection of bridges; k=0.5 for parallel connection of bridges.
p=pulse number of both rectifier bridges (in general p=3 and p=6 for practical reasons).
Icc=average value of load current.

In accordance with yet another aspect of the present invention, to set the synchronization of both semi-triangular currents with respect to the electric system the following rule applies: "any zero crossing of the semi-triangular current must coincide in time with the starting point of conduction of any diode or thyristor belonging to its associated bridge". Since this starting point of conduction is dependent on the system voltages on the AC side, ultimately it is these voltages which synchronize the semi-triangular currents. Also, since the bridges are out of phase by $\pi/p$, so too are the semi-triangular currents.

In accordance with one aspect of the present invention, the semi-triangular geometry of bridge currents is achieved through two forced-commutated switches (for example IGBT's). Each switch is connected in series with the associated bridge while keeping the same conduction direction. The opening and closing of these two switches are independently controlled so that the semi-triangular shape is obtained for each bridge current. This circuit is named "first proposed apparatus". When the bridges are connected in series, with a highly inductive load, two electrolytic capacitors are used to facilitate the circulation of the alternating components of the semi-triangular currents through the respective bridges (please see FIG. 3b). Additionally, these capacitors smooth the voltage and current on the DC side.

In accordance with another aspect of the present invention, there is a "second proposed apparatus", which is valid when both bridges are connected in series. In this second option the above mentioned switches are placed together forming one bidirectional switch, which is positioned between bridges and capacitors as shown in FIG. 4.

In accordance with yet another aspect of the present invention, there is a "third proposed apparatus", which is applicable both to the series and parallel connections of bridges. In this circuit the bridges contain only forced-commutated switches, with none found outside the bridges as shown in FIGS. 5a) and 5b). In the three proposed apparatuses the correct opening and closing of the forced-commutated switches allows the semi-triangular geometry required by each bridge current. In this way a notable current distortion reduction is achieved on the AC side of the rectifier system.

In accordance with another aspect of the present invention, there is finally a "fourth proposed apparatus", which is a combination of the "first and third proposed apparatuses". Therefore, the conventional circuit must be modified as follows: a) replacement in one of the bridges of every diode or thyristor with forced-commutated switches keeping the same conduction direction and b) one forced-commutated switch connected in series with the second bridge keeping the same conduction direction.

In accordance with one aspect of the present invention, it is another objective to protect the forced-commutated switches against destructive overvoltages on their terminals when opening. These switches must also be protected against overheating when operating at high switching frequencies. Forced-commutated switches can be adequately protected against overvoltages with snubber circuits (for example CAP IGBT) and in the case of overheating the protection occurs through the use of efficient heat sinks.

In accordance with another aspect of the present invention, in the "first proposed apparatus" two semi-triangular reference signals must be produced to set the switch currents (please see currents $I_{c1}$ and $I_{c2}$ in FIGS. 7 and 8). Each signal is generated with a basic microprocessor (for example PIC16F873), plus a digital-analog converter for the necessary conversion (for example DAC0808). For the appropriate synchronization of currents $I_{c1}$ and $I_{c2}$ to occur, each microprocessor must be fed with a signal containing the starting time of conduction of any diode or thyristor in the associated bridge. While a microprocessor produces a reference in digital form, with the adequate synchronization and frequency, its associated digital-analog converter produces the reference in analog form, with the appropriate magnitude. This magnitude is dependent on the average value of load current as shown in the equation of FIG. 6.

In accordance with yet another aspect of the present invention, in the "second proposed apparatus", the shape of the current circulating through the bidirectional switch is alternating and triangular so the reference signals for each switch are the positive and negative parts of such an alternating current. The load voltage in this "second proposed apparatus" is not reduced by the switch voltages as occurs in the "first proposed apparatus" (please see FIG. 4), and the forced-commutated switches conduct only the alternating components of bridge currents resulting in less power handling.

In accordance with one aspect of the present invention, in the "third proposed apparatus" the same two reference signals of the "first proposed apparatus" must be produced. Each reference signal is then multiplied by trains of pulses with appropriate zeros and ones in order to produce all the references associated to the given bridge. The forced-commutated switches in the "third proposed apparatus" have shorter periods of conduction than in previous apparatuses and, as a result, those switches have a low-power level. This is important as the forced-commutated switches have serious limitations regarding power capabilities.

In accordance with another aspect of the present invention, the switch current is forced to follow its reference by the opening and closing of the switch as shown in FIG. 22. This is achieved through the use of three electronic components: an instrumentation amplifier (for example AMP03GP), an operational amplifier (for example LM311) and a basic microprocessor (for example PIC16F84A). This process of comparison, between the reference and switch currents, occurs in every given forced-commutated switch. This control circuit achieves great distortion reduction in currents $I_A$, $I_B$ and $I_C$ and a low switching frequency with fewer switch losses.

In accordance with yet another aspect of the present invention, if in the "first proposed apparatus" the forced-commutated switches are short-circuited, they are put out of service and the current distortion returns. However, under this condition the switches do not conduct current and can be replaced in case of failure without the need to stop the load service, which may prove critical. Such short-circuiting is also useful to protect the forced-commutated switches under conditions of severe disturbances in the electric system. This online replacement also applies to the "second proposed apparatus", though it is not applicable to the "third proposed apparatus", where the system is disconnected for switch replacement.

In accordance with one aspect of the present invention, switch currents must be monitored along with load current and it is therefore important to have adequate current sensors (for example LEM 100 A/5V). In the case of load current the average value is required and consequently a low-pass filter is needed (for example MAX294). Finally, all the monitored currents must be amplified through an operational amplifier.

In accordance with another aspect of the present invention, in the case of a 12-pulse AC/DC rectifier system (6-pulse bridges connected in series or parallel), the connection of the three-phase transformer can be either $\Delta Y\Delta$ or $YY\Delta$.

In accordance with yet another aspect of the present invention, in the case of a 6-pulse AC/DC rectifier system (3-pulse bridges connected in series or parallel), the connection of the three-phase transformer must be either $\Delta Y$ for series connection of bridges or $\Delta YY$ for parallel connection. The series connection is particularly popular given that two 3-pulse bridges connected in series produce the 6-pulse AC/DC rectifier or Graetz Bridge, widely used in industry.

In accordance with one aspect of the present invention, the control circuit of the laboratory prototype requires four levels of voltage involving the following devices: TTL (5 V), operational amplifiers (−15, +15 V) and optocouplers (18 V).

BRIEF DESCRIPTION OF THE DRAWINGS

The objectives and advantages of the invention will be understood by reading the following detailed description in conjunction with the drawings in which:

FIG. 6) shows the ideal shape of the semi-triangular current in the cases where p=3 and p=6.

FIG. 8 shows the ideal current waveforms in a 12-pulse AC/DC rectifier system (two 6-pulse bridges connected in parallel), with the "first proposed apparatus".

FIG. 9 illustrates the circuit and typical waveforms of a 12-pulse AC/DC rectifier system with two 6-pulse bridges connected in series.

FIG. 11 illustrates the circuit and typical waveforms of a 12-pulse AC/DC rectifier system with two 6-pulse bridges connected in parallel and an R-L load on the DC side.

FIG. 12 shows the circuit of FIG. 11 with the addition of the "first proposed apparatus".

FIG. 14 shows the circuit of FIG. 13 with the addition of the "first proposed apparatus".

FIG. 16 shows the circuit of FIG. 15 with the addition of the "first proposed apparatus".

FIG. 17 illustrates typical waveforms and the respective circuit, when "n" loads, lineal and non-lineal, are simultaneously fed.

FIG. 18 shows the circuit of FIG. 17 with the addition of a number of filters designed as the "first proposed apparatus".

DETAILED DESCRIPTION OF THE PREFERRED EMBODIMENTS

Figure 1:
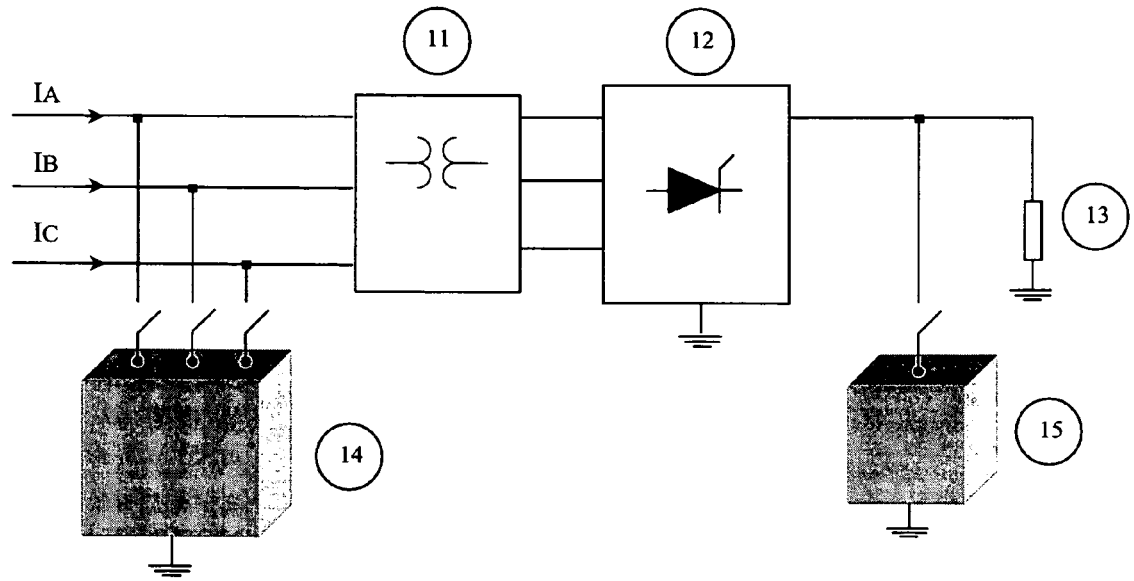
FIG. 1 illustrates an AC/DC rectifier system, together with the conventional and proposed alternatives for reducing the distortion of currents $I_A$, $I_B$ and $I_C$.

The various features of the invention are now described with respect to the figures, in which like parts are identified with the same reference characters.

Conventional methods reduce current distortion by applying direct action on the AC side of the rectifier system. Conversely, the proposed method does the same by applying direct action on the DC side of the rectifier system. It is demonstrated that when a precise shape is given to the current on the DC side, the AC currents upstream of the rectifier and transformer are also modified, theoretically producing a pure sinusoid with zero distortion at the entrance of the system. The proposed method can be implemented with four distinct apparatuses, each one with its associated advantages and disadvantages. It is possible for two of the four apparatuses to be repaired on line without the need to disconnect the system. The method achieves remarkable distortion reductions, at convenient size, cost and efficiency, with a simple and robust control system allowing rapid load variations. In general, the conventional apparatuses to reduce distortion are more complex, bulky and inefficient, given that they are installed on the AC side of the system.

FIG. 1 illustrates an AC/DC rectifier system, together with two options to reduce the distortion of currents $I_A$, $I_B$ and $I_C$. Device 14 represents the conventional option and device 15 the proposed option. It is demonstrated at laboratory level that device 15 is more advantageous than device 14.

Figure 2:
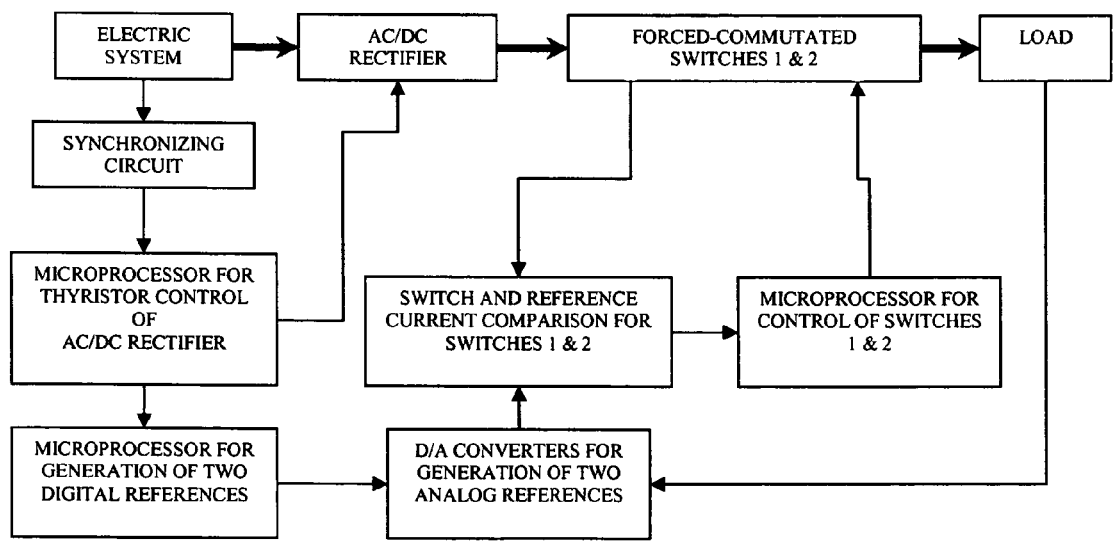
FIG. 2 shows the control circuit in block diagram of an AC/DC rectifier with the addition of two forced-commutated switches, the latter representing either the "first or the second proposed apparatuses".

FIG. 2 shows the control circuit in block diagram of an AC/DC rectifier with the addition of forced-commutated switches 1 and 2. These switches can represent either the "first or the second proposed apparatuses". One microprocessor controls the rectifier thyristors and provides a second microprocessor with the system synchronizing signal, which in turn generates two reference signals in digital form for switches 1 and 2. Two digital-analog converters then transform these signals into analog form and adjust the magnitudes as a function of the average load current (please see equation in FIG. 6). Each reference signal is then compared with the associated switch current. Finally, a third microprocessor controls the opening and closing of switches 1 and 2 by keeping the error between reference signals and switch currents within a certain tolerance (please see FIG. 22).

Figure 3A:
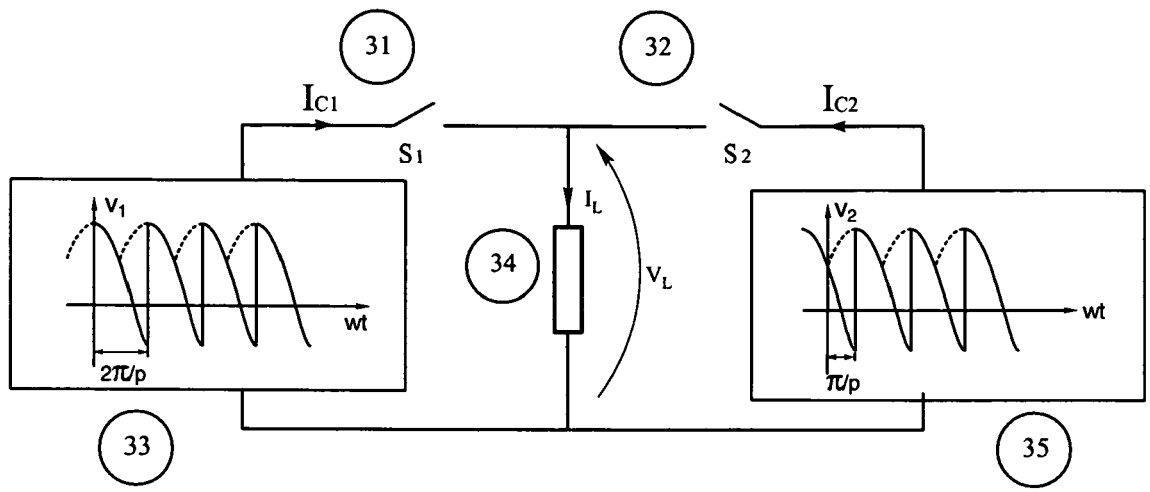
FIG. 3a) illustrates the "first proposed apparatus" considering the parallel connection of rectifier bridges.

FIG. 3a) illustrates the "first proposed apparatus" considering the parallel connection of bridges (devices 33 and 35). There are also two forced-commutated switches (devices 31 and 32), each one connected in series with each bridge and with the same conduction direction. The bridge voltages are out of phase by $\pi/p$ so as to double the number of pulses of the AC/DC rectifier. In the case of an R-L load of high inductance, the alternating components of the semi-triangular currents can circulate around the circuit without entering the load. In general, the parallel connection of bridges is used to serve loads with high current and low voltage, which constitutes the majority of industrial applications.

Figure 3B:
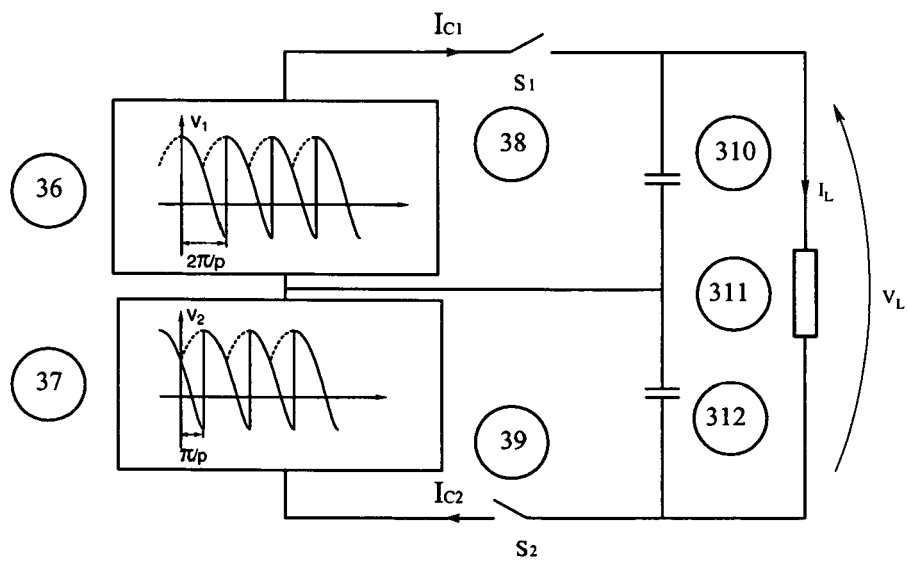
FIG. 3b) shows the "first proposed apparatus" considering the series connection of rectifier bridges.

FIG. 3b) shows the "first proposed apparatus" considering the series connection of bridges (devices 36 and 37). The said bridges are connected in series with two forced-commutated switches (devices 38 and 39), with the same conduction direction. Two capacitors are used to facilitate the circulation of the alternating components of the semi-triangular currents through the respective bridges without the need to enter the load, which can be highly inductive (device 311). In general, the series connection of bridges is used to serve loads with high voltage and low current, where HVdc transmission of electric energy is a typical example. Also, 3-pulse bridges connected in series produce the 6-pulse rectifier or Graetz Bridge, widely used in industry.

Figure 4:
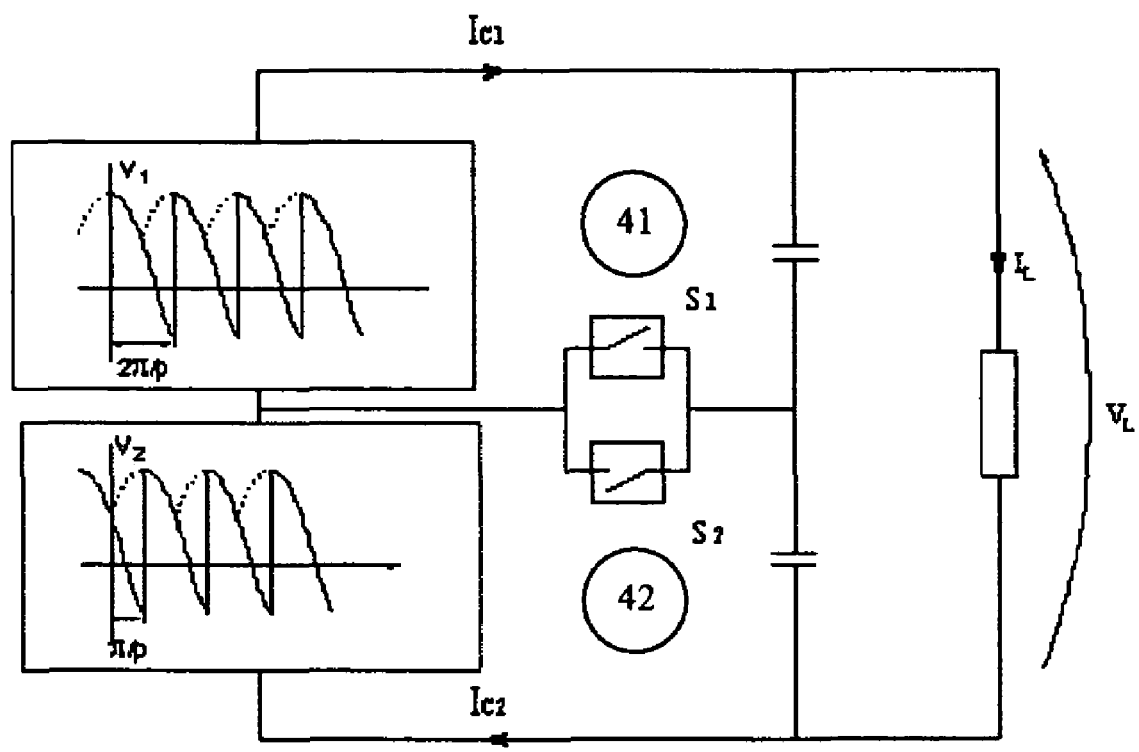
FIG. 4) illustrates the "second proposed apparatus" considering the series connection of rectifier bridges.

FIG. 4) illustrates the "second proposed apparatus", which is applicable to the series connection of bridges. The two forced-commutated switches (devices 41 and 42) now form one bidirectional switch, which is positioned between bridges and capacitors. The shape of the current through the bidirectional switch is now alternating and triangular. The advantages of this "second proposed apparatus" as compared to the "first proposed apparatus" are: a) the load voltage is not reduced by the switch voltages and b) the forced-commutated switches conduct only the alternating components of bridge currents resulting in less power handling. This is important as the forced-commutated switches have serious limitations regarding power capabilities.

Figure 5A:
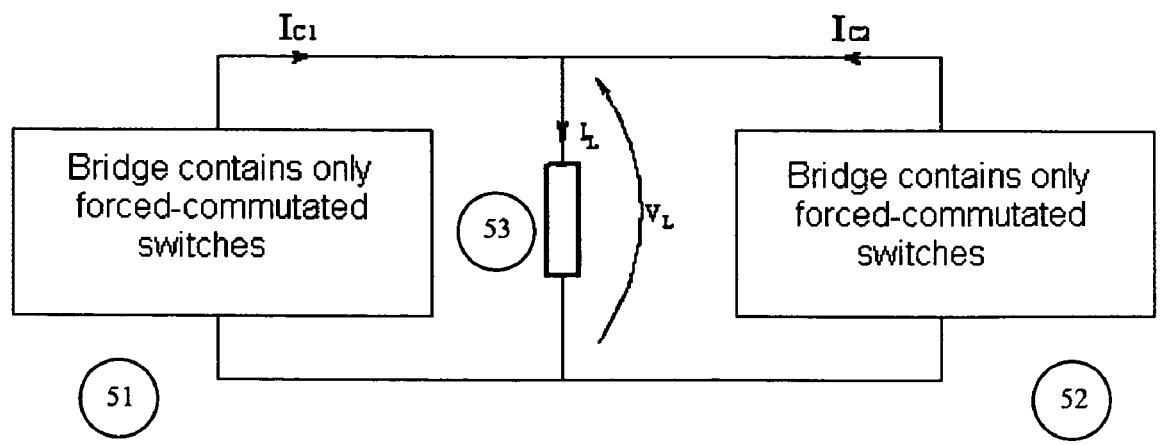
FIG. 5a) shows the "third proposed apparatus" considering the parallel connection of rectifier bridges.
Figure 5B:
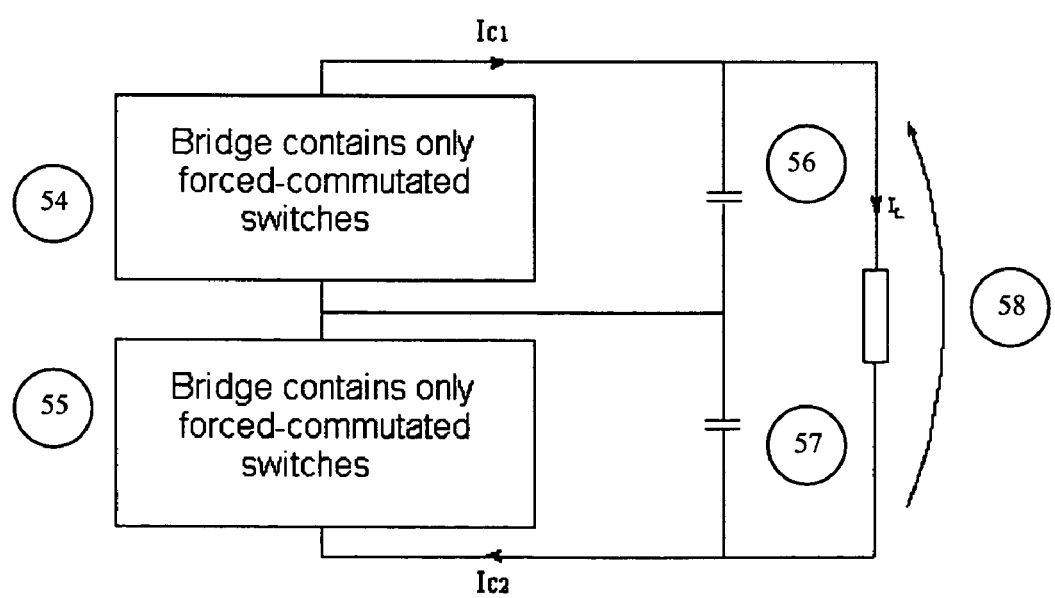
FIG. 5b) illustrates the "third proposed apparatus" considering the series connection of rectifier bridges.

FIGS. 5a) and 5b) show the "third proposed apparatus", which is applicable to the parallel and series connection of bridges. In this case the bridges are only formed by forced-commutated switches, with none found outside the bridges. The control is similar to the "first proposed apparatus", since the same two reference signals must be produced. Each reference signal is then multiplied by trains of pulses with appropriate zeros and ones so as to produce all the references of the associated bridge. In this "third proposed apparatus" the power handling of each forced-commutated switch is less than that of the two previous apparatuses, however, on line replacement of switches is not possible.

FIG. 6 illustrates the theoretical shape of the current circulating through each bridge of the AC/DC rectifier, in which two cases are analyzed where p=3 and p=6. This must be semi-triangular, with curved sides. Clearly, the period of the semi-triangular current is $2\pi/p$ and accordingly the frequency is (p·f) Hz, where f is the fundamental frequency. It is demonstrated that this semi-triangular current circulating through each bridge, develops into a theoretically pure sinusoid at the entrance of the rectifier system.

Figure 7:
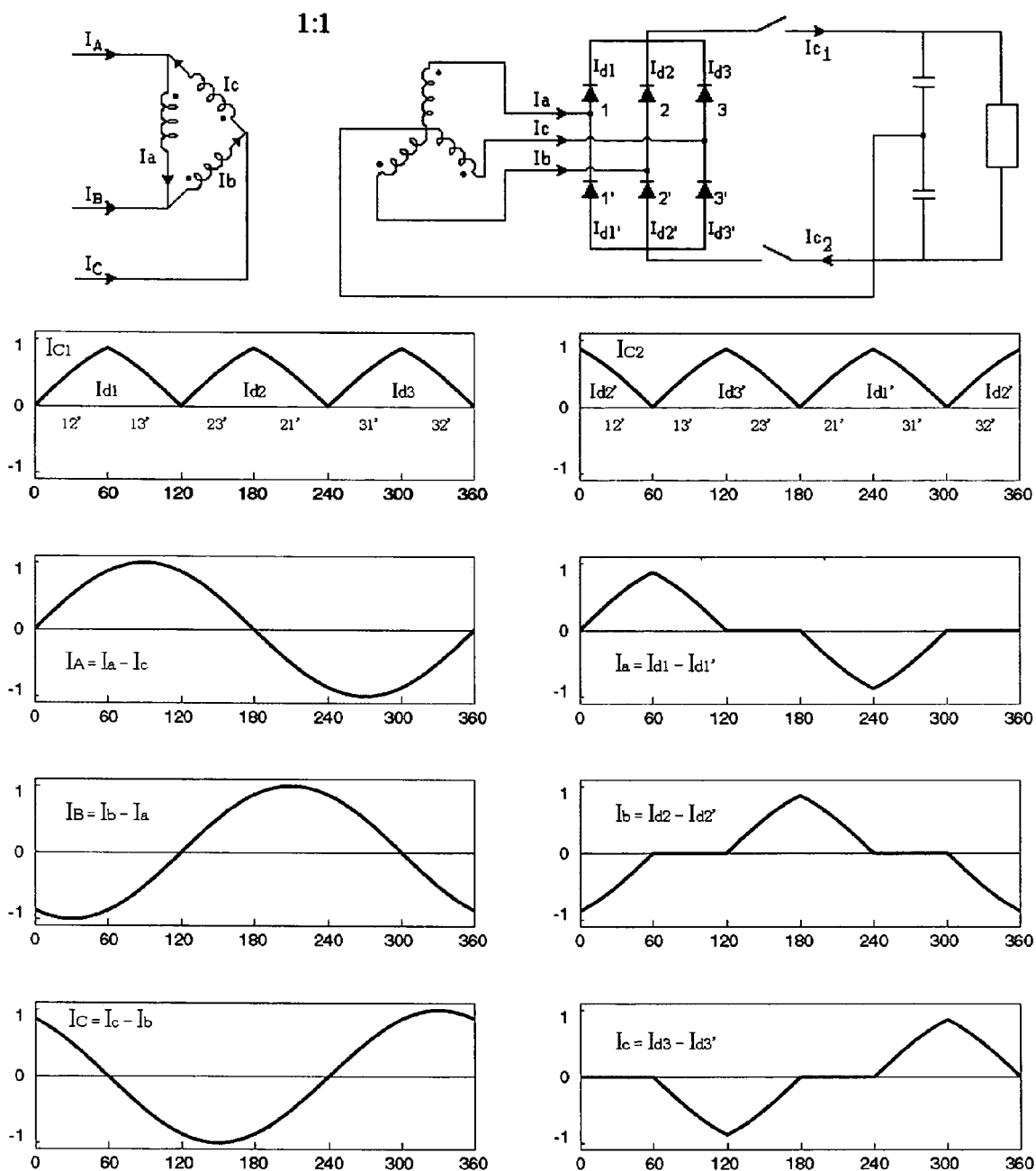
FIG. 7 illustrates the ideal current waveforms in a 6-pulse AC/DC rectifier system (two 3-pulse bridges connected in series), with the "first proposed apparatus".

FIG. 7 theoretically shows the wave shape of currents related with a 6-pulse AC/DC rectifier system (bridges in series), when the proposed method is applied. The first two diagrams show the following: a) currents $I_{C1}$ and $I_{C2}$; b) upper and lower diodes closed every 60° and c) currents $I_{d1}$, $I_{d2}$, $I_{d3}$, $I_{d1'}$, $I_{d2'}$, $I_{d3'}$. The remaining diagrams show currents $I_a$, $I_b$, $I_c$ and $I_A$, $I_B$, $I_C$ after the graphic subtraction indicated. It can be noted that in the formation of currents $I_A$, $I_B$ and $I_C$ around the zero crossing (60° before and 60° after), only one of the three currents $I_a$, $I_b$ and $I_c$ is present. However, in the formation of the positive and negative peaks two of the three currents $I_a$, $I_b$, $I_c$ are present. Clearly, perfect sinusoidal currents are formed with zero distortion at the input of the AC/DC rectifier system.

FIG. 8 theoretically illustrates the wave shape of currents related with a 12-pulse AC/DC rectifier system (bridges in parallel), when the proposed method is applied. The turn ratio of primary Δ with secondary Δ is 1:1 and with secondary Y is 1:$\sqrt{3}$, so as to produce symmetrical secondary voltages. The effect of the secondary currents on the primary current $I_A$ is analyzed by superposition and clearly the secondary Δ contributes with $I_{a'}$. For the contribution of the secondary Y FIG. 7 is illustrative given the similarity of the situation. The difference being that in 120° of diode conduction currents $I_{C1}$ and $I_{C2}$ develop two periods. In addition to this, the contribution of secondary Y must be reduced by $\sqrt{3}$ owing to the turn ratio. The 30° phase difference between secondary currents, due to the secondary connection ΔY, is also taken into account. It can be noted that in the formation of currents $I_A$, around the zero crossing (30° before and 30° after), only one of the two currents $I_a$ and $I_c$ is present. For the rest of the shape two or three currents out of the three currents $I_{a'}$, $I_a$, $I_c$ are present. As in FIG. 7 ideal and perfect sinusoidal currents are formed with zero distortion at the input of the AC/DC rectifier system.

FIG. 9 shows the circuit and typical waveforms of a 12-pulse AC/DC rectifier system with two 6-pulse bridges connected in series. Diagram 97, taken with an oscilloscope, shows the voltage and current waveforms at the load ($V_L$ and $I_L$). Diagram 98, taken with a register model 1650 (Reliable Power Meters), shows the waveforms of input currents $I_A$, $I_B$ and $I_C$, together with the respective distortion index (THD=10.52%).

In the circuit of FIG. 9, windings 91, 92 and 93 are the windings of a 3-phase transformer in connection ΔYΔ (the connection YYΔ is also possible). Six-pulse bridges 94 and 96 are connected in series to feed the load with high voltage and low current. This type of load is found when handling HVdc energy transmission systems.

Practical installations for HVdc energy transmission systems, however, require more elements than those shown in FIG. 9. As the distortion of currents $I_A$, $I_B$ and $I_C$ is unacceptable (THD=10.52%), it is current practice to install passive filters on the AC side at great cost and with large size to reduce current distortion. Furthermore, it is a common option to use a smoothing reactor in series with the load to smooth the load current.

Figure 10:
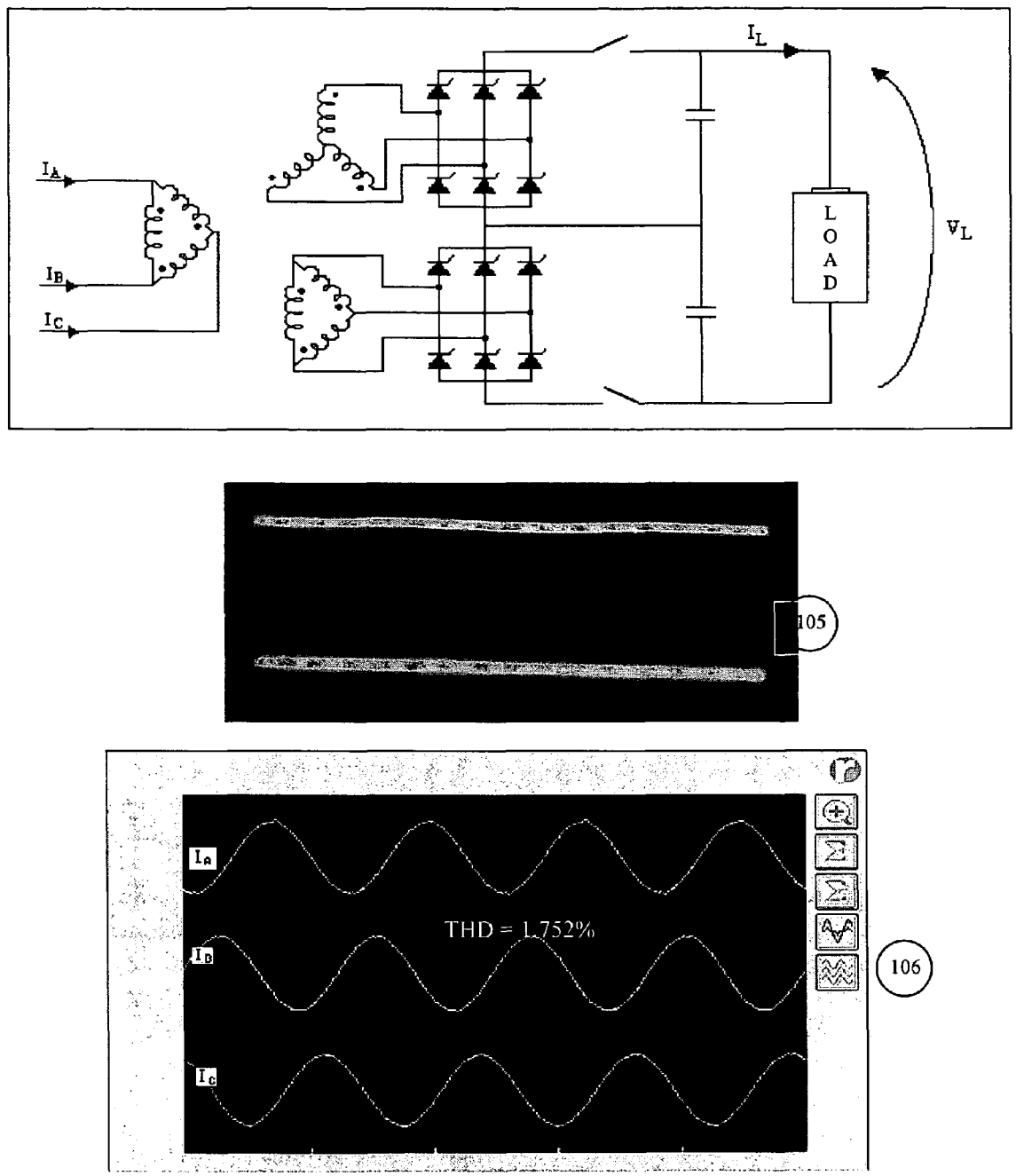
FIG. 10 shows the circuit of FIG. 9 with the addition of the "first proposed apparatus".

FIG. 10 illustrates the circuit of FIG. 9 with the addition of the "first proposed apparatus". It can be noted that two forced-commutated switches (elements 101 and 104) and two electrolytic capacitors (elements 102 and 103) are added. Load voltage and current are now flat and currents $I_A$, $I_B$ and $I_C$ on the primary side of the transformer are remarkably sinusoidal.

The proposed active filter reduces the distortion index from THD=10.52% to THD=1.752%.

FIG. 11 shows the circuit and typical waveforms of a 12-pulse AC/DC rectifier system with two 6-pulse bridges connected in parallel and an R-L load on the DC side. This circuit is similar to the circuit shown in FIG. 9, though here bridges are connected in parallel and reactor 112 is added so as to flatten currents $I_{C1}$ and $I_{C2}$. Without reactor 112, currents $I_{C1}$ and $I_{C2}$ pulsate, placing stress on the thyristors of bridges 115 and 117. The same instruments mentioned in previous diagrams are used for diagrams 1110 and 1111.

The parallel connection of bridges 115 and 117 is appropriate for medium-power loads where high current and low voltage is required, which is the characteristic of most industrial applications. The following equipment falls within this power range: frequency changers to feed induction motors, direct current motors, electrochemical plants, railway systems, induction furnaces, uninterruptible power supplies (UPS), etc.

FIG. 12 illustrates the circuit of FIG. 11 without reactor 112 and with the addition of forced-commutated switches 123 and 124. These changes allow the implementation of the "first proposed apparatus". Currents $I_A$, $I_B$ and $I_C$ on the AC side of the rectifier system are now remarkably sinusoidal with very low distortion. The "first proposed apparatus" reduces the distortion from THD=10.5% to THD=1.496%. FIGS. 11 and 12 also show the change in shape of currents $I_{C1}$ and $I_{C2}$ after the application of the forced-commutated switches (please see diagrams 111, 113, 121 and 122). Clearly, the semi-triangular waveforms at 300 Hz modify currents $I_A$, $I_B$ and $I_C$, reducing their distortion notably.

Figure 13:
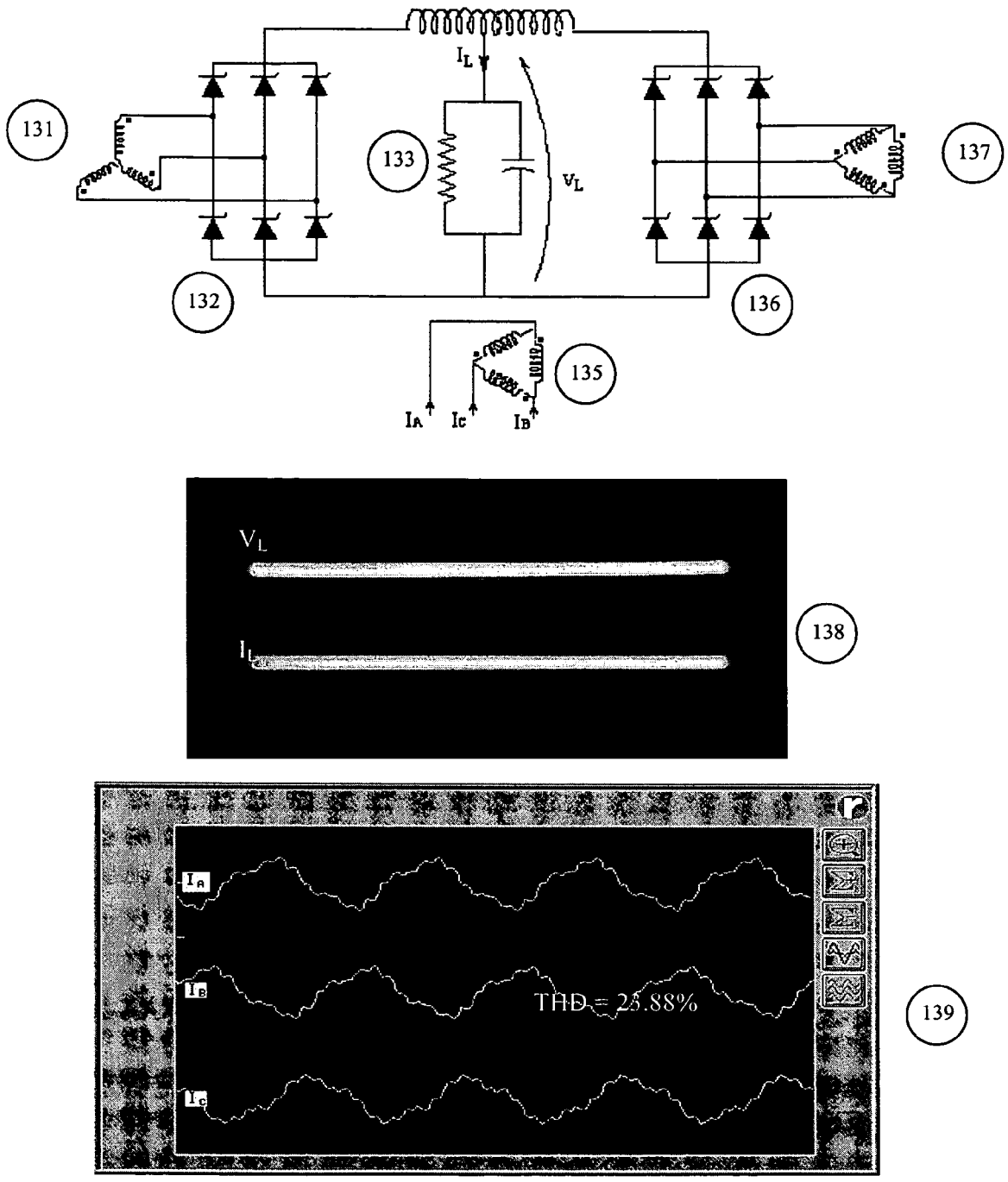
FIG. 13 illustrates the circuit and typical waveforms of a 12-pulse AC/DC rectifier system with two 6-pulse bridges connected in parallel and an R-C load on the DC side.

FIG. 13 shows the circuit related to a 12-pulse AC/DC rectifier system with two 6-pulse bridges connected in parallel and an R-C load on the DC side. This load is appropriate to model frequency changers, DC motors, etc. It can be noted that the capacitor smoothes the voltage on the DC side (please see diagram 138). In contrast, it worsens the current distortion on the AC side of the rectifier system, which is clearly illustrated by diagram 139. The same instruments mentioned in previous diagrams were used for diagrams 138 and 139.

FIG. 14 illustrates the circuit of FIG. 13 without reactor 134 and with the addition of forced-commutated switches 141 and 142. As in FIG. 12, the semi-triangular currents on the DC side modify currents $I_A$, $I_B$ and $I_C$ at the entrance of the rectifier system, reducing their distortion. The "first proposed apparatus" reduces the distortion index from THD=23.88% to THD=1.521%.

Figure 15:
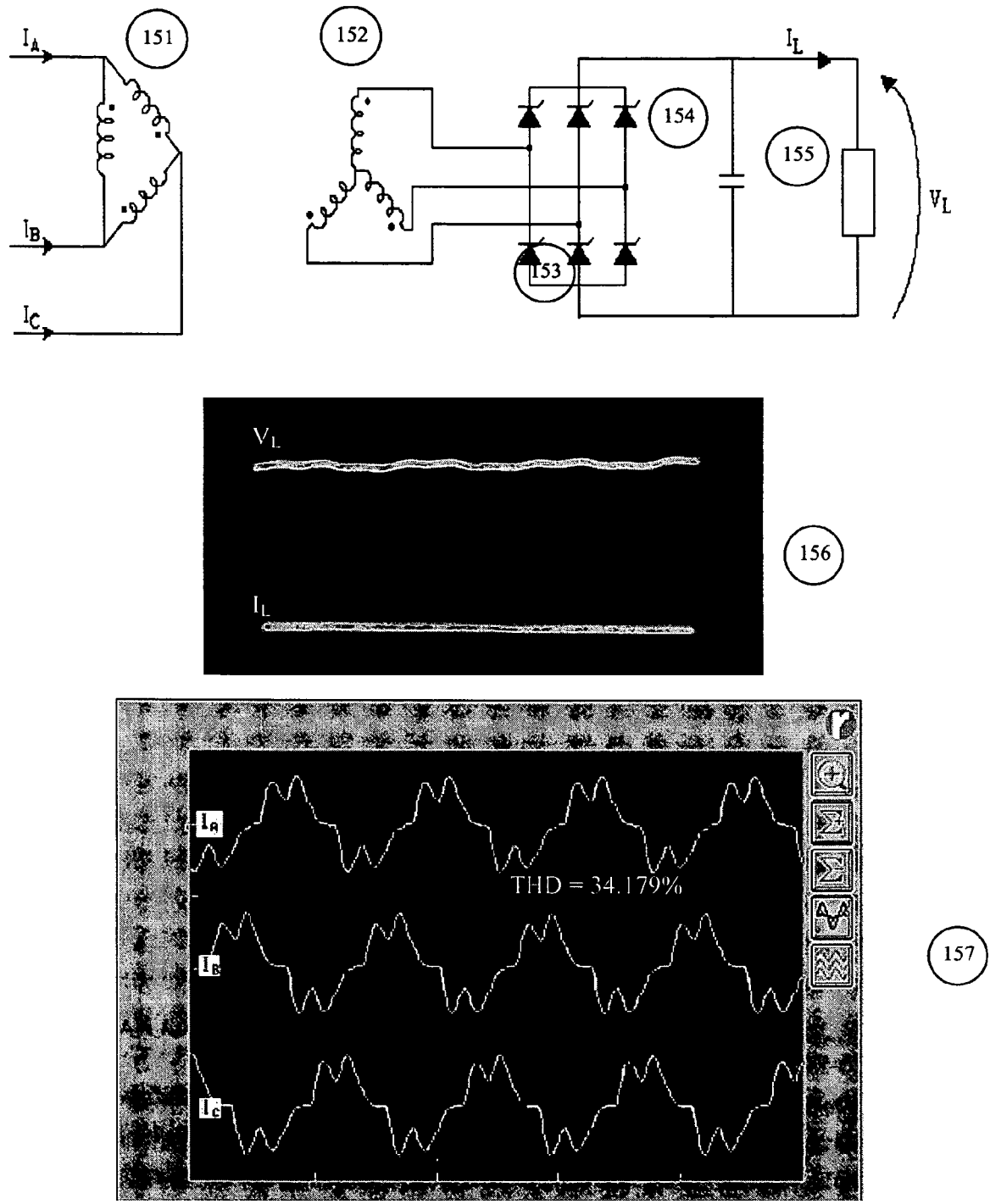
FIG. 15 illustrates the circuit and typical waveforms of a 6-pulse AC/DC rectifier system with two 3-pulse bridges connected in series considering a smoothing capacitor on the DC side.

FIG. 15 shows the circuit related to a 6-pulse AC/DC rectifier system, with a capacitor to smooth the voltage on the DC side. The rectifier is formed with two 3-pulse bridges connected in series. The circuit also considers a three-phase transformer ΔY and a load, which in general is an inverter feeding a variable speed induction motor.

Diagram 156 shows the waveforms of load voltage and current ($V_L$ and $I_L$) and diagram 157 the waveforms of currents $I_A$, $I_B$ and $I_C$ at the entrance of the rectifier system. The same instruments mentioned in previous diagrams are used for diagrams 156 and 157. Clearly, the electrolytic capacitor greatly distorts the currents on the AC side resulting in THD=34.179%.

The circuit previously mentioned is found in the following low-power equipment: frequency changers for induction motors, direct current motors, telephone plants, uninterruptible power supplies (UPS), etc.

FIG. 16 illustrates the circuit of FIG. 15, with the addition of forced-commutated switches 161 and 162 and capacitors 163 and 164. Again, the semi-triangular shape on the DC current reduces the distortion of currents $I_A$, $I_B$ and $I_C$ on the primary side of the transformer. The "first proposed apparatus" reduces the distortion from THD=34.179% to THD=2.7%. In addition, capacitors 163 and 164 smooth the load voltage and current ($V_L$ and $I_L$). Diagrams 165 and 166 are taken by instruments previously identified.

FIG. 17 shows the circuit of "n" loads, lineal and non-lineal, simultaneously fed. The distortion reduction is achieved on the primary side of the transformer. The circuit specifically considers two non-lineal loads (6-pulse rectifiers with capacitors on the DC side) and one lineal load (resistor). In general, this circuit is similar to that shown in FIG. 15, the difference being that various loads are now connected to the secondary side of the transformer forming a "multi-load system". Diagram 1710 illustrates waveforms of currents $I_A$, $I_B$ and $I_C$ on the primary side of transformer. Clearly, electrolytic capacitors 174 and 177 greatly distort currents $I_A$, $I_B$ and $I_C$ giving a distortion index of THD=31.422%.

FIG. 18 illustrates the circuit shown in FIG. 17 with the addition of capacitors 182, 184, 186 and 188; and switches 181, 183, 185 and 187. Once again, the semi-triangular shape of DC currents reduces the distortion of currents $I_A$, $I_B$ and $I_C$ on the primary side of the transformer. The distortion is reduced from THD=31.422% to THD=2.796%, as illustrated in diagram 189.

Figure 19:
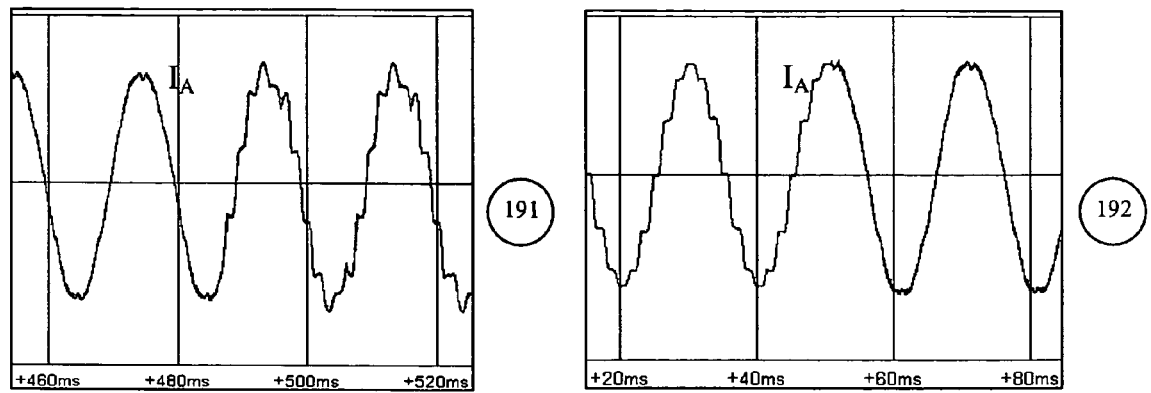
FIG. 19 illustrates the behavior of current $I_A$ on the AC side of the rectifier system; when the proposed apparatus is put out of, and into service again.

FIG. 19 shows the behavior of current $I_A$ on the AC side of the rectifier, when initially the forced-commutated switches are short-circuited (as in the left diagram). Such a short circuit is then released (as in the right diagram). At the time of the short circuit no current circulates through the switches, allowing them to be restored in cases of switch failure without the need to stop the load service, which can prove critical. Such action may also be useful to protect the switches from severe disturbances in the electric power system. This online replacement applies to the "first and second proposed apparatuses", but is not applicable to the "third proposed apparatus", where system disconnection must occur to facilitate switch replacement.

Figure 20:
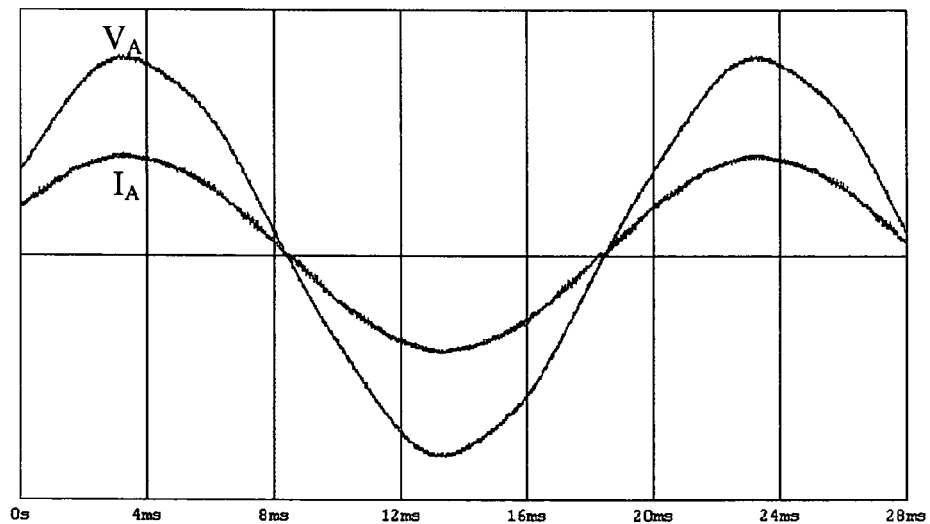
FIG. 20 shows voltage and current of phase "A" on the AC side of the rectifier system when the proposed apparatus is operating.

FIG. 20 illustrates voltage and current of phase "A" at the entrance of the rectifier system with the "first proposed apparatus" functioning. It can be noted that the voltage distortion is higher than that of the current. In FIG. 20 the power factor magnitude is "1" due to the use of diodes in the rectifier. In the case of thyristors, where α≠0°, the power factor magnitude is less than "1" and power factor improvement must be achieved through the conventional method of using capacitors.

Figure 21:
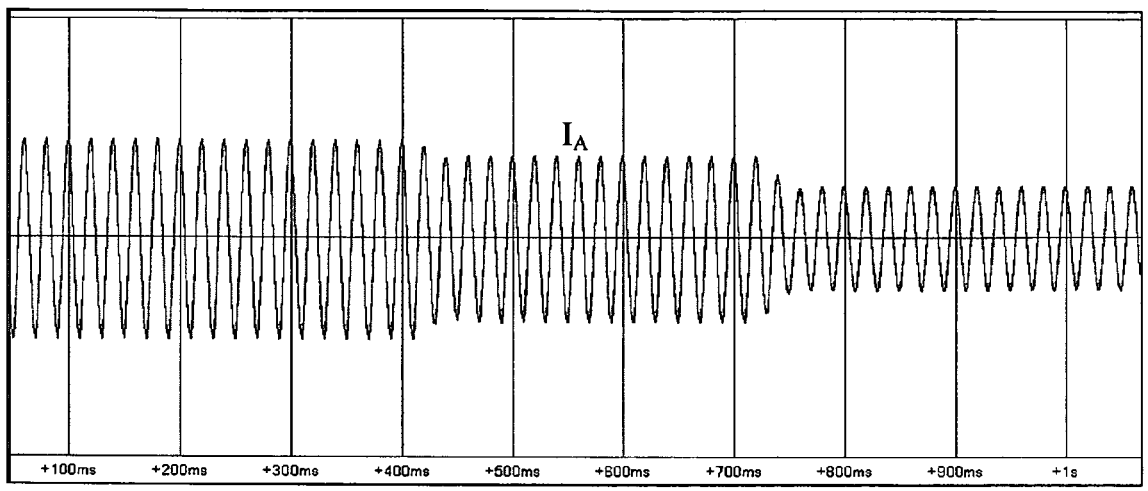
FIG. 21 illustrates how the proposed apparatus responds quickly and efficiently under rapid load variations on the DC side.

FIG. 21 shows that the "first proposed apparatus" almost instantaneously follows any rapid load variation on the DC side, without affecting the distortion reduction in currents $I_A$, $I_B$ and $I_C$ at the entrance of the rectifier system. Therefore, the proposed apparatus shows a robust control and good dynamic response under rapid load variations.

Figure 22:
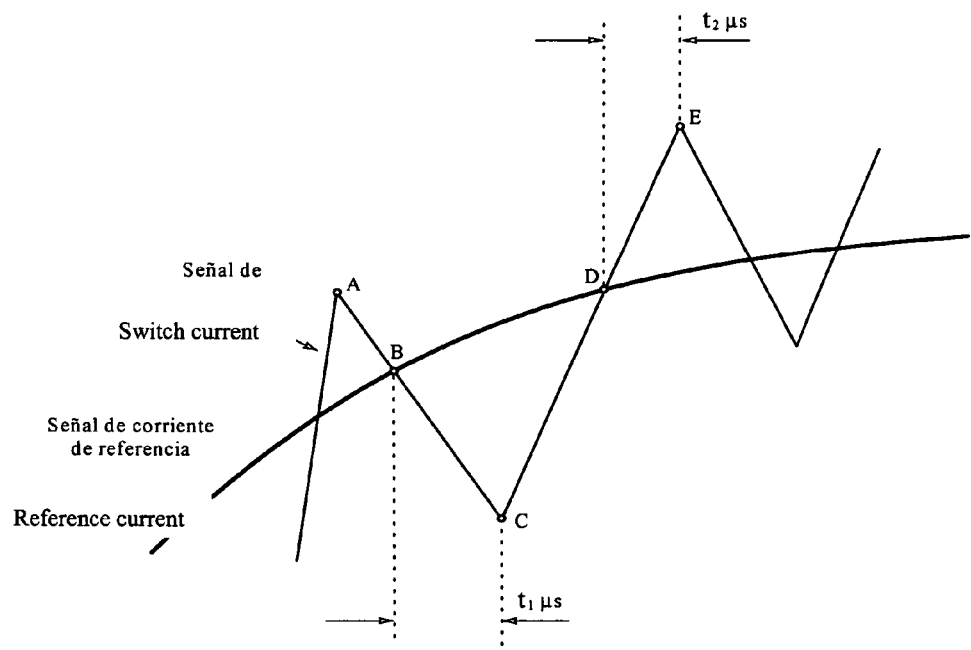
FIG. 22 shows how the switch current follows the reference through successive and appropriate switching actions.

FIG. 22 illustrates how a particular switch current follows its reference through appropriate switching actions. When a switch current and its reference are introduced into a comparator an error is determined, proving positive or negative. This error is then introduced into a second comparator, which digitalizes the error, with "1" representing positive error and "0" representing negative error. This digital error signal is fed into a microprocessor. The edges of this digital error signal define points B and D in FIG. 22. In instant B the microprocessor counts $t_1$ and closes the switch in instant C. In instant D the microprocessor counts $t_2$ and opens the switch in instant E and so on. It can be noted that by reducing $t_1$ and $t_2$ the switch current follows its reference more closely. Additionally, the switching frequency is approximately constant (regardless of the reference geometry), which reduces switch losses.

Figure 23:
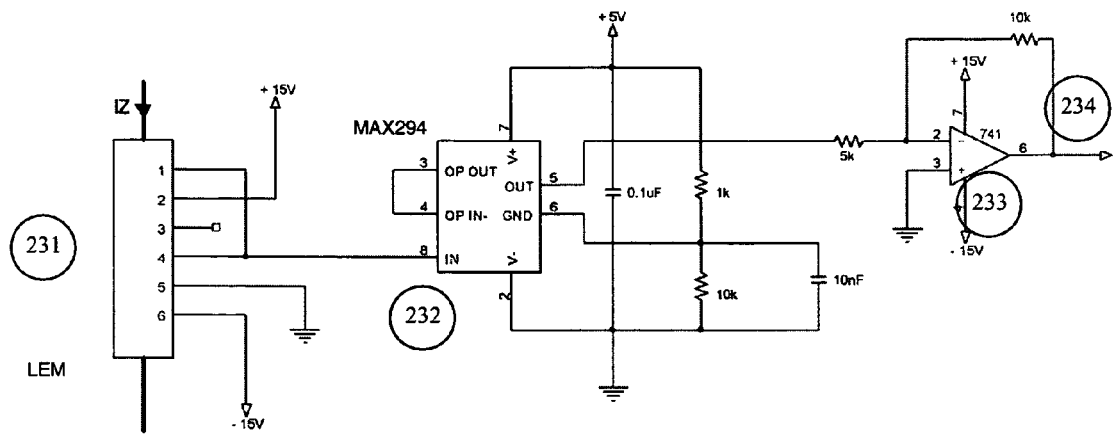
FIG. 23 illustrates the circuit for monitoring the average value of load current.

FIG. 23 shows the circuit monitoring the average value of load current. This monitoring is performed by current sensor 231. This sensor is based on the Hall-effect, detecting current signals between 0 Hz and 100 kHz and transforming them into an equivalent voltage. Low-pass filter 232 then determines the average value of the signal, amplified by the operational amplifier 233. For stability reasons, the operational amplifier 233 is used in negative connection, however, this negative output is compensated for by inverting the output of current sensor 231. Finally, signal 234, with the average value of load current, is fed into port 234 of the circuit in FIG. 24.

Figure 24:
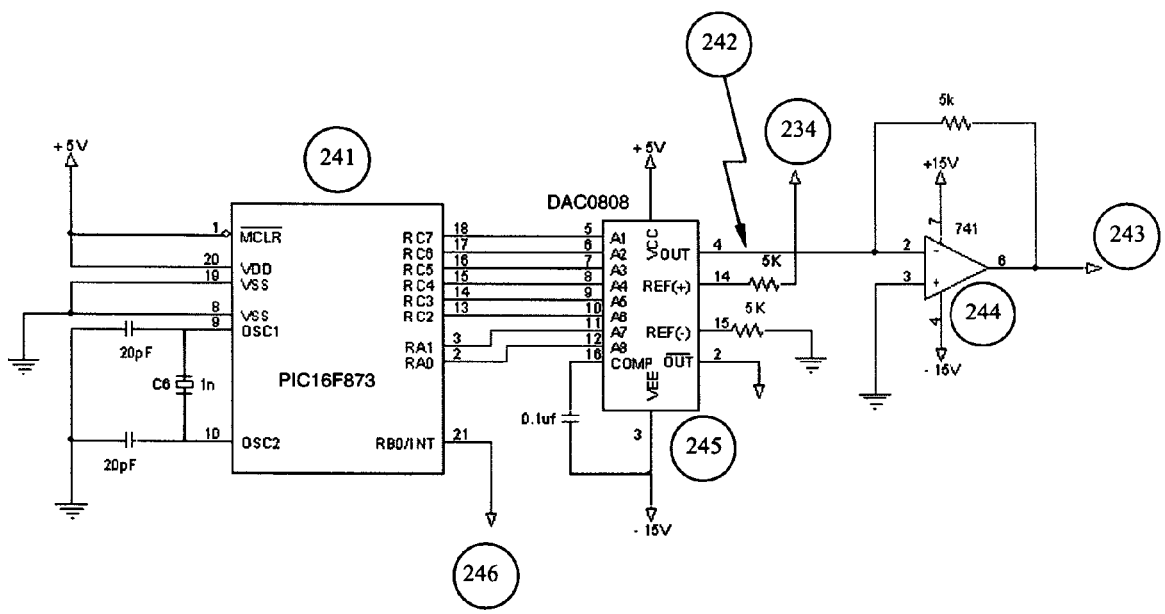
FIG. 24 shows the circuit for generating one semi-triangular current reference associated to a particular forced-commutated switch.

FIG. 24 illustrates the circuit which generates the reference signal for one of the switches. To obtain this reference signal a microprocessor PIC16F873 (element 241) is used. This microprocessor stores a program which generates the reference signal in digital form, with the correct frequency and synchronization. The synchronization is given by a signal with the starting time of conduction of any diode or thyristor within the associated bridge (signal 246 in FIG. 24). The digital reference then enters digital-analog converter DAC0808, which requires operational amplifier 244 to operate (manufacturer's condition). The analog reference signal is finally generated at the output of operational amplifier 244 (signal 243 in FIG. 24). The average value of the load current (signal 234 in FIGS. 23 and 24) must also feed the digital-analog converter to define the reference signal magnitude.

Figure 25:
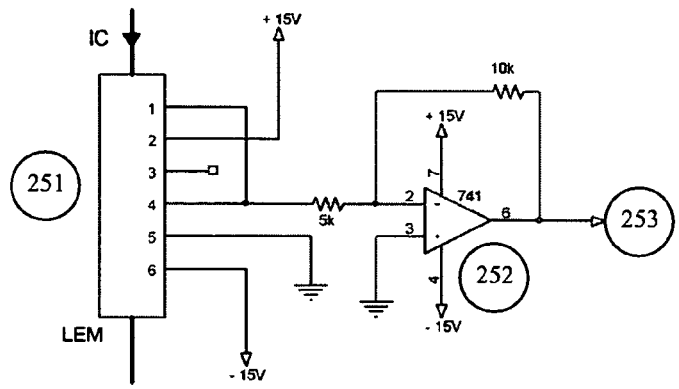
FIG. 25 illustrates the circuit for monitoring the current of each forced-commutated switch.

FIG. 25 shows the circuit to monitor the instant current circulating for each forced-commutated switch. The switch current is monitored by current sensor 251 and the resulting signal is amplified by the operational amplifier 252 (in negative connection). The negative connection is used for stability reasons, however, the output is made positive by entering an opposite input at current sensor 251. Finally, signal 253 enters port 253 in the circuit of FIG. 26.

Figure 26:
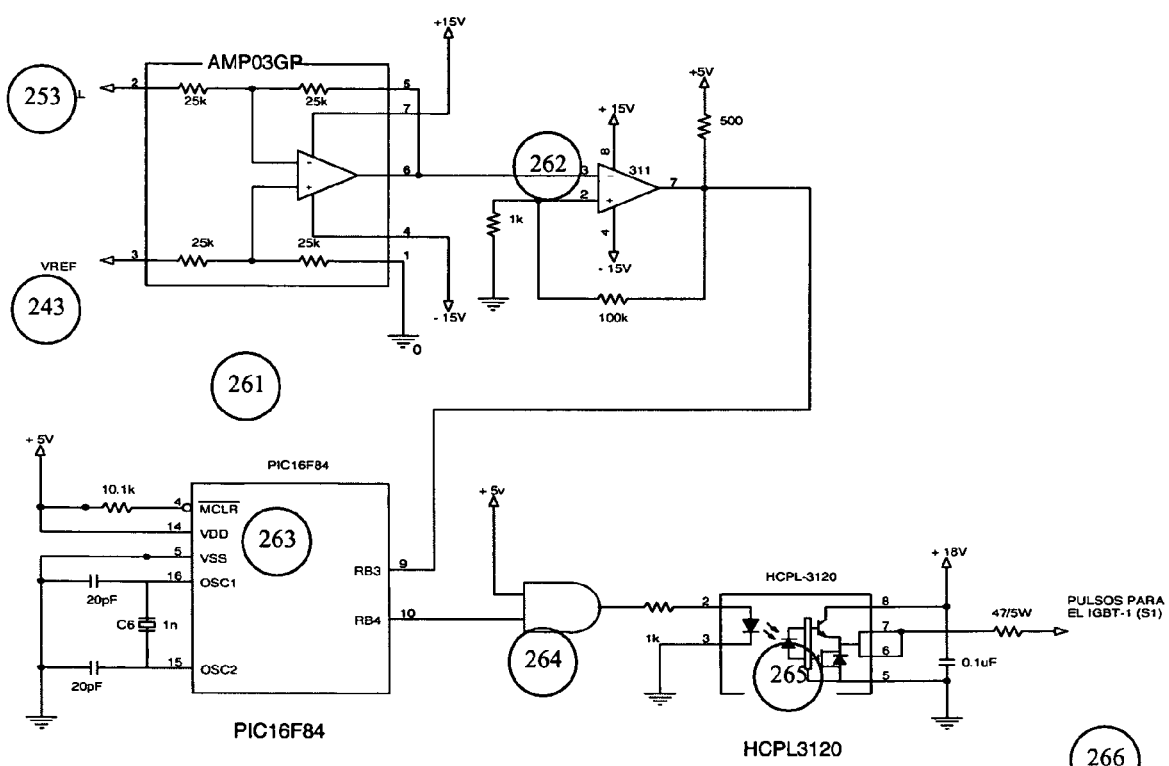
FIG. 26 shows the circuit for controlling the opening and closing of a particular switch by comparing the associated switch and reference currents.

FIG. 26 illustrates the circuit to compare signals 253 and 243, which are the switch current and its reference respectively. The error between these signals, proving positive or negative, is defined by instrumentation amplifier 261. Operational amplifier 262 digitalizes this error, with "1" representing positive error and "0" representing negative error. Operational amplifier 262 is in negative connection, however, the output is made positive by entering an opposite input at instrumentation amplifier 261. The output of operational amplifier 262 enters the microprocessor PIC16F84 (element 263), which in turn gives the output signal to control the opening and closing of the associated switch, keeping the error within a tolerance band (please see FIG. 22). This last control signal is amplified through buffer 264 and isolated from the power circuit through optocoupler 265. Finally, signal 266 enters the control gate of the respective switch.

The control of the second switch is carried out by similar circuits to those shown in FIGS. 24, 25 and 26.

The invention has been explained with reference to precisely described embodiments. However, it will be readily apparent to those experts in the field that it is possible to embody the invention in specific forms other than those of the preferred embodiments described above. This may be done only when the spirit of the invention is maintained. The preferred embodiments are merely illustrative and should not be considered restrictive in any way. The scope of the invention is given by the appended claims, rather than the preceding description, and all variations and equivalents which fall within the range of the claims are intended to be embraced therein.

The invention claimed is:

1. A method to obtain ideally zero distortion in currents $I_A$, $I_B$ and $I_C$ that feeds a system characterized by a transformer connected downstream with a thyristor-based AC/DC rectifier, comprising:
modifying with due precision a shape of the direct current circulating through each of the two bridges of the thyristor-based AC/DC rectifier, wherein the modifying comprises:
defining the shape of the direct current through each bridge;
determining a period of the direct current through each bridge;
defining a frequency of the direct current through each bridge;
determining a magnitude of the direct current through each bridge; and
defining a synchronization of the direct current through each bridge with respect to the system,
wherein the shape of the direct current through each bridge is semi-triangular with:
a) two symmetrical curved sides,
b) both sides belonging to a positive semi-period of a sinusoidal waveform, and
c) both sides adjacent to zero-crossings of the sinusoidal waveform.

2. The method of claim 1, wherein the sinusoidal waveform is at a system frequency.

3. The method of claim 1, wherein the period of the direct current through each bridge "2π/p", wherein "p" is the number of pulses of bridge voltages within one period at a system frequency.

4. The method of claim 1, wherein the frequency of the direct current through each bridge "f·p", wherein "f" is the system frequency and "p" the number of pulses of bridge voltages within one period at the system frequency.

5. The method of claim 1, wherein said magnitude of the direct current through each bridge is $$Y = \frac{\pi}{p}\sin\frac{\pi}{p} \cdot \frac{Icc}{\left(1 - \cos\frac{\pi}{p}\right)}$$

where:
X=magnitude of direct current through each bridge,
k=1 for serial bridges connection, k=0.5 for parallel bridges connection,
p=number of pulses of voltage of both bridges, and
Icc=average value of load current.

6. The method of claim 1, wherein the synchronization of the direct current through each bridge with respect to the system includes: any zero crossing of the direct current through each bridge, wherein the zero crossing coincides in time with a staffing point of conduction of any thyristor belonging to its associated bridge.

7. An apparatus to obtain ideally zero distortion in currents $I_A$, $I_B$ and $I_C$ that feed a system characterized by a transformer connected downstream with a thyristor-based AC/DC rectifier, comprising:
means for modifying a shape of the direct current circulating through each of two bridges of the thyristor-based AC/DC rectifier; and
means for keeping an error between an ideal and a real bridge currents within a certain tolerance, wherein the shape of the direct current through each bridge is semi-triangular with:
a) two symmetrical curved sides,
b) both sides belonging to a positive semi-period of a sinusoidal waveform, and
c) both sides adjacent to zero-crossings of the sinusoidal waveform.

8. The apparatus of claim 7, wherein said means for modifying the shape of the direct currents circulating through each of the two bridges is two forced-commutated switches, each switch connected in series with an associated bridge while keeping a same conduction direction.

9. The apparatus of claim 8, wherein an interphase reactor of a conventional connection is omitted.

10. The apparatus of claim 7, wherein said means for keeping the error between the ideal and real bridge currents within a certain tolerance including:
means for instantly monitoring the real bridge current;
means for producing the ideal current through the bridges;
means for instantly monitoring the error between the ideal and real bridge currents; and
means for maintaining the error within a certain tolerance by controlling opening and closing of a forced-commutated switch associated to the corresponding bridge.

11. The apparatus of claim 10, wherein said means for producing the ideal current including:
means for generating the ideal current by using both digital and analogue devices;
means for instantly monitoring an average value of load current in order to adjust a magnitude of the ideal current; and
means for instantly monitoring a starting point of conduction of any thyristor belonging to a given bridge in order to adjust a synchronization of an associated bridge current with the system.

12. A method to obtain ideally zero distortion in currents $I_A$, $I_B$ and $I_C$ that feeds a system characterized by a transformer connected downstream with a thyristor-based AC/DC rectifier, comprising:
modifying with due precision a shape of the direct current circulating through each of the two bridges of the thyristor-based AC/DC rectifier, wherein the modifying comprises:
defining the shape of the direct current through each bridge;
determining a period of the direct current through each bridge;
defining a frequency of the direct current through each bridge;
determining a magnitude of the direct current through each bridge; and
defining a synchronization of the direct current through each bridge with respect to the system,
wherein said magnitude of the direct current through each bridge is $$Y = \frac{\pi}{p}\sin\frac{\pi}{p} \cdot \frac{Icc}{\left(1 - \cos\frac{\pi}{p}\right)}$$

where:
X=magnitude of direct current through each bridge,
k=1 for serial bridges connection, k=0.5 for parallel bridges connection,
p=number of pulses of voltage of both bridges, and
Icc=average value of load current.

* * * * *

UNITED STATES PATENT AND TRADEMARK OFFICE
CERTIFICATE OF CORRECTION

PATENT NO. : 7,551,461 B2  
APPLICATION NO. : 10/860661  
DATED : June 23, 2009  
INVENTOR(S) : Miguel Villablanca Page 1 of 1

It is certified that error appears in the above-identified patent and that said Letters Patent is hereby corrected as shown below:

In Column 12, Claim 5, Lines 40-45:

Please delete the equation "$Y = \frac{\pi}{p} \sin \frac{\pi}{p} \cdot \frac{Icc}{(1 - \cos \frac{\pi}{p})}$" and insert equation $$X = k \cdot \frac{\pi}{p} \sin \frac{\pi}{p} \cdot \frac{Icc}{(1 - \cos \frac{\pi}{p})}$$

--.

In Column 12, Claim 6, Line 57:
Please delete "a staffing point" and insert --a starting point--.

In Column 14, Claim 12, Lines 22-27:

Please delete the equation "$Y = \frac{\pi}{p} \sin \frac{\pi}{p} \cdot \frac{Icc}{(1 - \cos \frac{\pi}{p})}$" and insert equation $$X = k \cdot \frac{\pi}{p} \sin \frac{\pi}{p} \cdot \frac{Icc}{(1 - \cos \frac{\pi}{p})}$$

--.

Signed and Sealed this

Fifteenth Day of December, 2009

David J. Kappos  
*Director of the United States Patent and Trademark Office*